(12) United States Patent
Rezaei et al.

(10) Patent No.: US 12,251,758 B2
(45) Date of Patent: Mar. 18, 2025

(54) ADDITIVELY-MANUFACTURED STRUCTURE FOR REACTIONARY PROCESSES

(71) Applicant: The Curators of the University of Missouri, Columbia, MO (US)

(72) Inventors: Fateme Rezaei, Rolla, MO (US); Ali Rownaghi, Rolla, MO (US); Shane Lawson, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 17/589,440

(22) Filed: Jan. 31, 2022

(65) Prior Publication Data
US 2022/0241863 A1    Aug. 4, 2022

Related U.S. Application Data

(60) Provisional application No. 63/144,193, filed on Feb. 1, 2021.

(51) Int. Cl.
*B22F 10/64* (2021.01)
*B22F 1/107* (2022.01)
*B22F 1/145* (2022.01)
(Continued)

(52) U.S. Cl.
CPC .............. *B22F 10/62* (2021.01); *B22F 1/107* (2022.01); *B22F 1/147* (2022.01); *B22F 10/22* (2021.01);
(Continued)

(58) Field of Classification Search
CPC .......... B22F 10/62; B22F 1/107; B22F 1/147; B22F 10/22; B22F 10/64; B22F 10/18; B22F 2998/10; B22F 10/10; B22F 3/1021; B22F 3/1039; B22F 3/1007; B33Y 10/00; B33Y 40/10; B33Y 40/20; B33Y 70/00; B33Y 80/00; C04B 35/057; C04B 35/18; C04B 2235/3208; C04B 2235/3229; C04B 2235/3232; C04B 2235/3239; C04B 2235/3241; C04B 2235/3244; C04B 2235/3256; C04B 2235/3279;
(Continued)

(56) References Cited

U.S. PATENT DOCUMENTS 7,122,170 B2   10/2006   Ramane et al.
7,138,101 B2   11/2006   Keller et al.
(Continued)

FOREIGN PATENT DOCUMENTS

JP   6389490 B2   9/2018

OTHER PUBLICATIONS

Calcination, Encyclopedia Britannica, M. Ray, https://www.britannica.com/technology/calcination, last accessed Feb. 9, 2023 (Year: 2023).*

*Primary Examiner* — Rebecca Janssen
(74) *Attorney, Agent, or Firm* — Armstrong Teasdale LLP

(57) ABSTRACT

A method of additively manufacturing a structure for use in a reactionary process includes forming a material from metal or metal oxide particles, a dispersion solvent, and a binder. The method also includes depositing the material onto a build platform and curing the material to form a structure for use in a reactionary process. The structure includes the metal or metal oxide particles and is configured to provide a reaction when exposed to a reactant.

14 Claims, 18 Drawing Sheets

(51) Int. Cl.
*B22F 10/22* (2021.01)
*B22F 10/62* (2021.01)
*B33Y 10/00* (2015.01)
*B33Y 40/10* (2020.01)
*B33Y 40/20* (2020.01)
*B33Y 70/00* (2020.01)

(52) U.S. Cl.
CPC .............. *B22F 10/64* (2021.01); *B33Y 10/00* (2014.12); *B33Y 40/10* (2020.01); *B33Y 40/20* (2020.01); *B33Y 70/00* (2014.12)

(58) Field of Classification Search
CPC .... C04B 2235/3286; C04B 2235/3472; C04B 2235/349; C04B 2235/6026; C04B 2235/6567; C04B 2235/80; C04B 35/622
See application file for complete search history.

(56) References Cited

U.S. PATENT DOCUMENTS

| | | | |
|---|---|---|---|
| 9,327,448 B2 | 5/2016 | Shah et al. | |
| 9,492,811 B2 | 11/2016 | Ogunwumi et al. | |
| 9,839,907 B2 | 12/2017 | Coupland | |
| 2014/0217333 A1* | 8/2014 | Wang | B22F 1/0545 977/932 |
| 2016/0074844 A1* | 3/2016 | Freer | B01J 37/0009 502/201 |
| 2016/0168453 A1* | 6/2016 | Florio | C04B 35/622 507/203 |
| 2018/0272323 A1 | 9/2018 | Mullens et al. | |
| 2020/0016584 A1* | 1/2020 | Groeneveld | B01J 35/58 |
| 2020/0156035 A1* | 5/2020 | Yee | B33Y 70/10 |

* cited by examiner

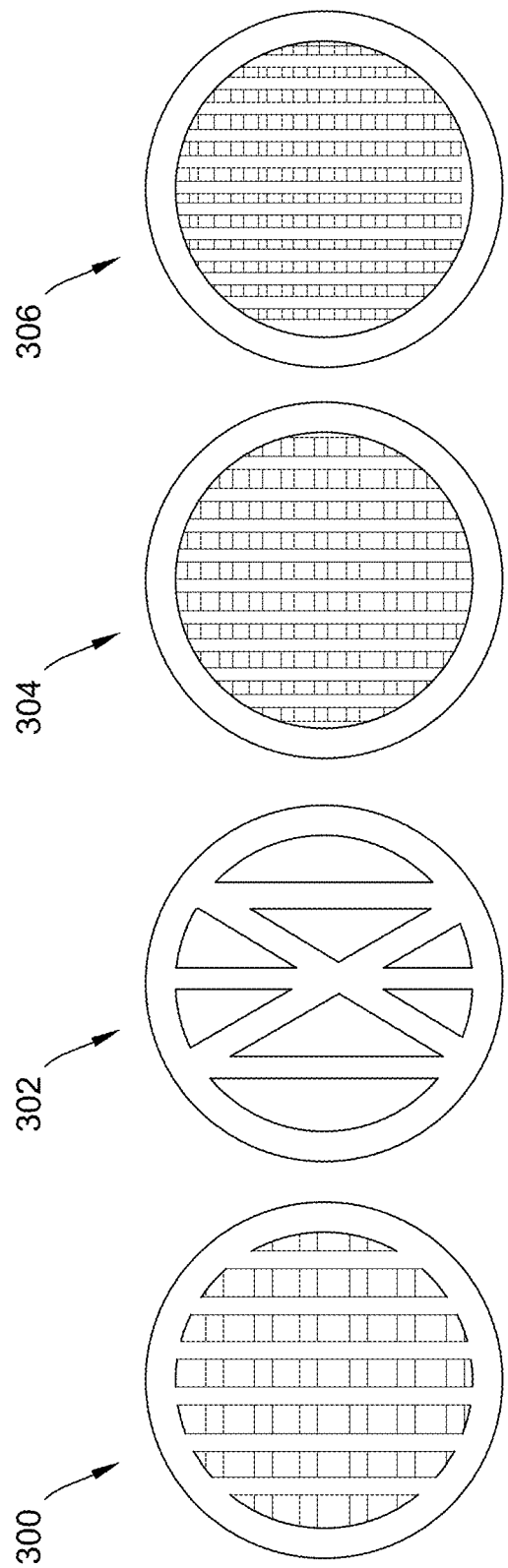

ADDITIVELY-MANUFACTURED STRUCTURE FOR REACTIONARY PROCESSES

CROSS-REFERENCE TO RELATED APPLICATIONS

This application claims priority to U.S. Provisional Application Ser. No. 63/144,193, filed on Feb. 1, 2021, the content of which is hereby incorporated by reference in its entirety.

BACKGROUND OF THE DISCLOSURE

The subject matter described herein relates generally to structures for reactionary processes and, more particularly, to structures for reactionary processes that are formed using additive manufacturing processes.

Structures designed for reactionary processes typically include a material that interacts with a reactant to provide a desired chemical process or reaction. For example, some structures include metal-organic frameworks (MOF) or other materials that are used for adsorption and catalytic processes. Sometimes the structures are formed using an additive manufacturing process. In typical additive manufacturing processes, a structure is formed by depositing a material in a series of layers and treating or consolidating the layers to form a solid structure. The additive manufacturing process may be less expensive and take less time than other processes to form the structures. In addition, the additive manufacturing process may provide greater control and precision of characteristics of the structure such as shape, size, and material properties than processes such as screw extrusion, pelletization, and granulation.

Typically, structures for catalytic processes are formed from a material including a metal oxide precursor, such as a dissolved metal nitrate salt. The structures are calcined, and the metal oxide precursor forms an active metal oxide in a process referred to as incipient impregnation. The structures formed using incipient impregnation perform effectively in catalytic processes, but the metal oxide precursor materials can limit how the structures are fabricated. For example, the dissolved nitrate salts produce hydrophobic inks that exhibit relatively poor rheological behavior (i.e., shear thickening, paste spreading, solvent expulsion, etc.) and are not usable for additive manufacturing if the nitrate loading is above a threshold level of, for example, 10 weight percentage.

Accordingly, there is a need for a process to additively manufacture structures for reactionary processes that overcomes the limitations of current processes.

BRIEF DESCRIPTION OF THE DISCLOSURE

In one aspect, a method of additively manufacturing a structure for use in a reactionary process includes forming an ink from metal or metal oxide particles, a dispersion solvent, and a binder. The method also includes depositing the ink onto a build platform and curing the ink to form a structure for use in a reactionary process. The structure includes the metal or metal oxide particles and is configured to provide a reaction when exposed to a reactant.

In another aspect, an additively manufactured structure for use in a reactionary process includes a material formed from a binder, a dispersion solvent, and metal or metal oxide particles. The structure includes the metal or metal oxide particles and is configured to provide a reaction when exposed to a reactant.

In yet another aspect, a method of using an additively manufactured structure in a reactionary process includes providing an additively manufactured structure including metal or metal oxide particles. The method also includes channeling a fluid flow including a reactant through the structure such that the metal or metal oxide particles are exposed to the reactant. The metal or metal oxide particles are configured to provide a reaction when the fluid flow is directed through the structure.

In still another aspect, a method of forming an ink for use in manufacturing a structure for use in a reactionary process includes combining metal or metal oxide particles, a dispersion solvent, and a binder to form an ink. The metal or metal oxide particles are configured to provide a reaction when exposed to a reactant.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 18 a top view of an additively manufactured structure including at least 200 cells per square inch arranged in a grid pattern.

FIG. 19 a top view of an additively manufactured structure having an open geometric design with trigonal channels.

FIG. 20 a top view of an additively manufactured structure including at least 400 cells per square inch arranged in a grid pattern.

FIG. 21 a top view of an additively manufactured structure including at least 600 cells per square inch arranged in a grid pattern.

DETAILED DESCRIPTION OF THE DISCLOSURE

As used herein, the term "reactionary process" refers to a process that occurs when at least one active agent is exposed to at least one reactant. For example and without limitation, reactionary processes include catalytic processes, adsorption processes, and photocatalytic processes.

As used herein, the term "ink" refers to a substance used for a printing process such as an additive manufacturing or 3-dimensional printing process. For example, an ink may comprise a hydrophobic substance that is deposited onto a surface to form a 3-dimensional object.

In this disclosure, systems and methods for additively manufacturing structures are described. For example, the additively manufactured structures may include one or more materials formed from a binder and metal or metal oxide particles. The structures may be used for reactionary process such as adsorption and/or catalytic processes. The structures may provide improved performance (e.g., increased adsorption or a more efficient catalytic conversion) in comparison to known structures for reactionary processes.

Figure 1:
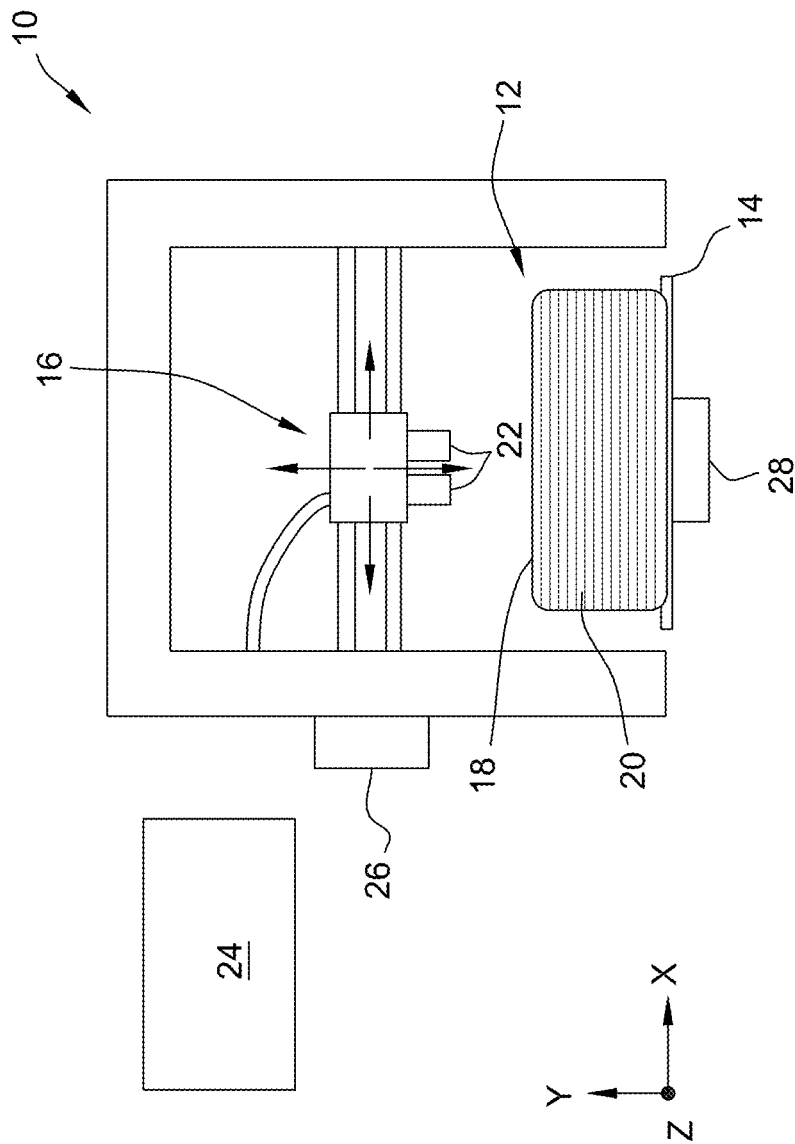
FIG. 1 is a schematic diagram of an exemplary embodiment of an additive manufacturing system for forming a structure.
Figure 6:
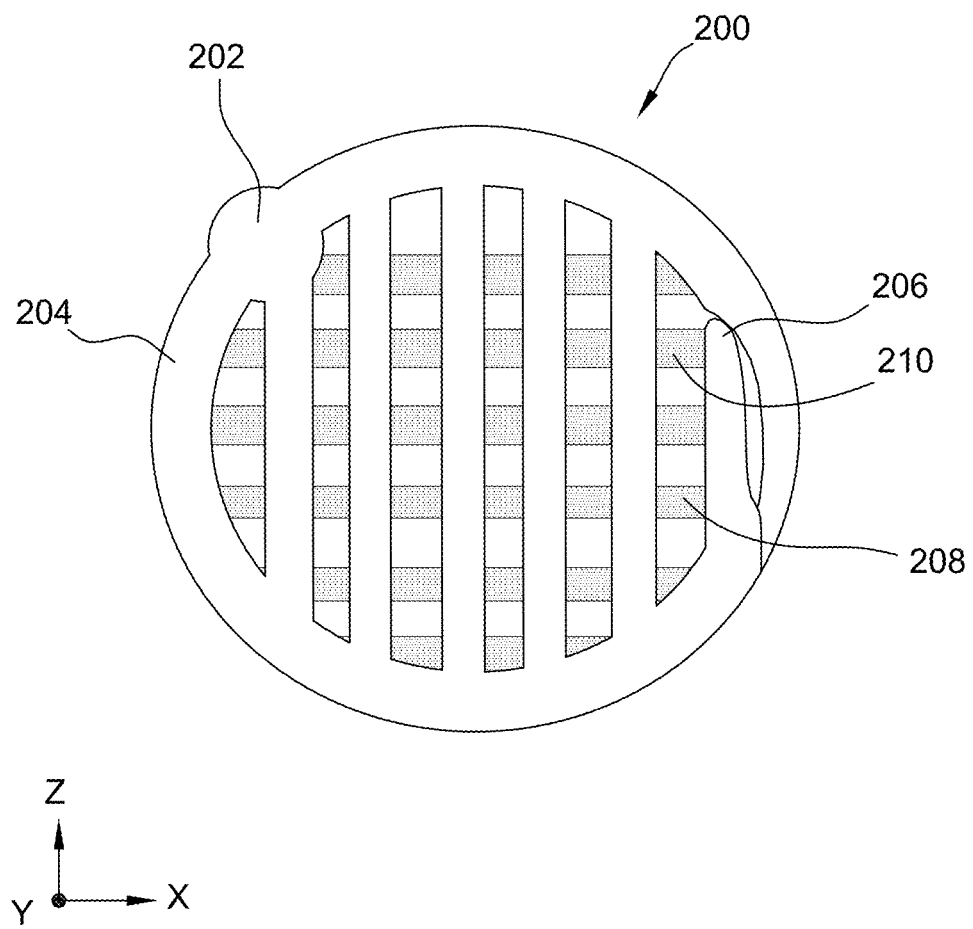
FIG. 6 is a top view of a multi-material structure formed using an additive manufacturing system.

FIG. 1 is a schematic diagram of an exemplary embodiment of an additive manufacturing system 10 for forming a structure such as a structure 12, a structure 30 (shown in FIG. 2), and a multi-material structure 200 (shown in FIG. 6). The additive manufacturing system 10 includes a build platform 14 and a dispenser 16. The dispenser 16 is configured to dispense a material, e.g., an ink, onto the build platform 14. In some embodiments, the additive manufacturing system 10 includes a consolidation device, such as a heat source or a binder jet, configured to consolidate the material dispensed by the dispenser 16.

The dispenser 16 is configured to dispense one or more materials 18, 20 onto the build platform 14. For example, the dispenser 16 may dispense a first material 18 and a second material 20 in a series of layers. In addition, the dispenser 16 may dispense the materials 18, 20 in a desired pattern on the build platform 14. Also, in some embodiments, the additive manufacturing system 10 may include a recoater assembly configured to distribute the materials 18, 20 across the build platform 14.

The materials 18, 20 dispensed by the dispenser 16 may be any materials suitable for forming the structure 12. In some embodiments, each material 18, 20 includes a binder that causes the material to solidify, i.e., cure, as the structure 12 is exposed to the environment. In further embodiments, the additive manufacturing system 10 may include a heat source to at least partially control the curing of the material 18, 20.

In the illustrated embodiment, the dispenser 16 includes a plurality of nozzles 22. Each nozzle 22 may be configured to dispense one of the materials 18, 20 onto the build platform 14. Accordingly, the dispenser 16 is configured to dispense a plurality of materials 18, 20 onto the build platform 14. In other embodiments, at least one nozzle 22 may be configured to dispense more than one material. For example, at least one of the nozzles 22 may be coupled to a plurality of material supplies and a valve or control device may control which material(s) are supplied to the nozzles. In alternative embodiments, the material 18, 20 may be provided to the build platform 14 in any suitable manner. For example, in some embodiments, the material 18, 20 is transferred from a hopper to the build platform 14 using a recoater assembly.

During operation of the additive manufacturing system 10, the dispenser 16 is operated to deposit one or more of the materials 18, 20 onto the build platform in a series of layers. For example, the first nozzle 22 of dispenser 16 may deposit a first material 18 onto the build platform 14 in a first layer. The second nozzle 22 may deposit a second material 20 onto or adjacent the first material 18 on the build platform 14 in a second layer. Additive manufacturing system 10 repeatedly deposits the materials 18, 20 in the layers until the structure 12 includes a desired number of layers.

In the exemplary embodiment, the first material 18 and the second material 20 each include binders that cause the materials to solidify, i.e., cure, as the structure 12 is exposed to the environment. For example, in some embodiments, the materials 18, 20 are each formed by mixing an active agent in a solvent including the respective binder and thereby forming a paste. The first material 18 and the second material 20 are able to be extruded and deposited on the build platform 14 in the paste form. In addition, the first material 18 and the second material 20 are configured to adhere together when the materials contact each other. For example, in some embodiments, the binder in the first material 18 and/or the binder in the second material 20 adheres to the other of the first material and the second material. The materials form a solid, contiguous structure when the materials cure. In alternative embodiments, the first material 18 and the second material 20 are adhered together in any suitable manner. For example, in at least some embodiments, a separate binder material is deposited between the first material 18 and the second material 20.

Also, during operation of the additive manufacturing system 10, the dispenser 16 is configured to move in vertical and horizontal directions (X-direction and Y-direction) relative to the build platform 14 in reference to the orientation of the additive manufacturing system 10 shown in FIG. 1. In addition, the build platform 14 is configured to move in a horizontal direction (Z-direction) relative to the dispenser 16. Accordingly, the dispenser 16 is able to deposit the materials in desired patterns and shapes on the build platform 14 and deposit the materials in a series of layers. In alternative embodiments, the build platform 14 may be moved in the vertical direction (Y-direction) relative to the dispenser 16 when the dispenser 16 deposits the layers of the materials 18, 20.

Moreover, in the exemplary embodiment, the additive manufacturing system 10 may include a computer control system, or controller 24. For example, the controller 24 may include a processor, a memory, and a user interface including an input device and a display. The controller 24 may control operation of components of the additive manufacturing system 10, such as one or more actuator systems 26, 28 and the dispenser 16, to fabricate the structure 12. For example, the controller 24 controls the amount of the material 18, 20 that is dispensed through each nozzle 22 of the dispenser 16.

In the exemplary embodiment, the additive manufacturing system 10 is operated to fabricate the structure 12 from a computer modeled representation of the 3D geometry of the component. The computer modeled representation may be produced in a computer aided design (CAD) or similar file. The CAD file of the structure 12 is converted into a format that includes a plurality of build parameters for one or more layers of the structure 12. In the exemplary embodiment, the structure 12 is modeled in a desired orientation relative to the origin of the coordinate system used in the additive manufacturing system 10. The geometry of the structure 12 is sliced into one or more layers. Once the process is completed, an electronic computer build file (or files) is generated, including all of the layers. The build file is loaded into the controller 24 of the additive manufacturing system 10 to control the system during fabrication of each layer.

After the build file is loaded into the controller 24, the additive manufacturing system 10 is operated to generate the structure 12 by implementing the additive manufacturing process. The exemplary additive manufacturing process does not use a pre-existing article as the precursor to the final structure; rather, the process produces structures from a raw material in a configurable form, such as particulate or paste. Additive manufacturing system 10 enables fabrication of structures using a broad range of materials, for example, and without limitation, metals, metal oxides, and group II metal carbonates, ceramics, glass, and polymers.

Moreover, in the exemplary embodiment, during operation of the additive manufacturing system 10, the controller 24 is able to control the operation of the actuator system 26, 28 to adjust the height and position of the dispenser 16 and/or the build platform 14. In the exemplary embodiment, the dispenser 16 is moved vertically and horizontally using the actuator system 26. In addition, the build platform 14 is moved horizontally using the actuator system 28. In alternative embodiments, the dispenser 16 and/or the build platform 14 is moved in any manner that enables the additive manufacturing system 10 to operate as described herein.

Figure 2:
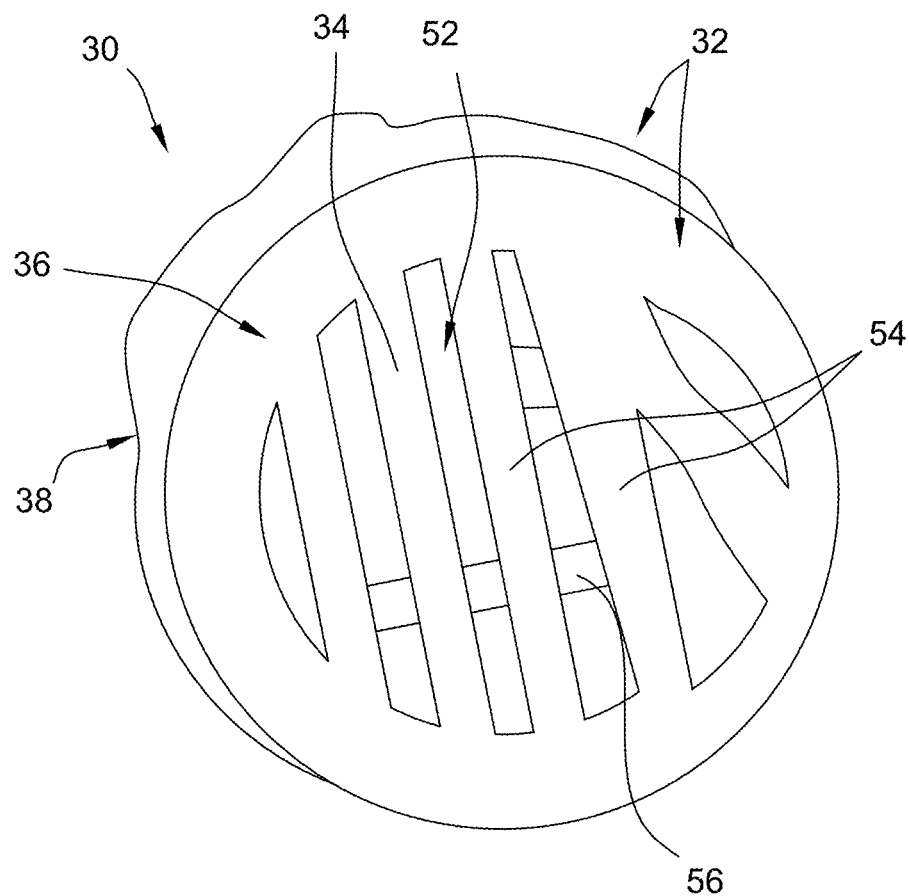
FIG. 2 is a top view of an additively manufactured structure.
Figure 3:
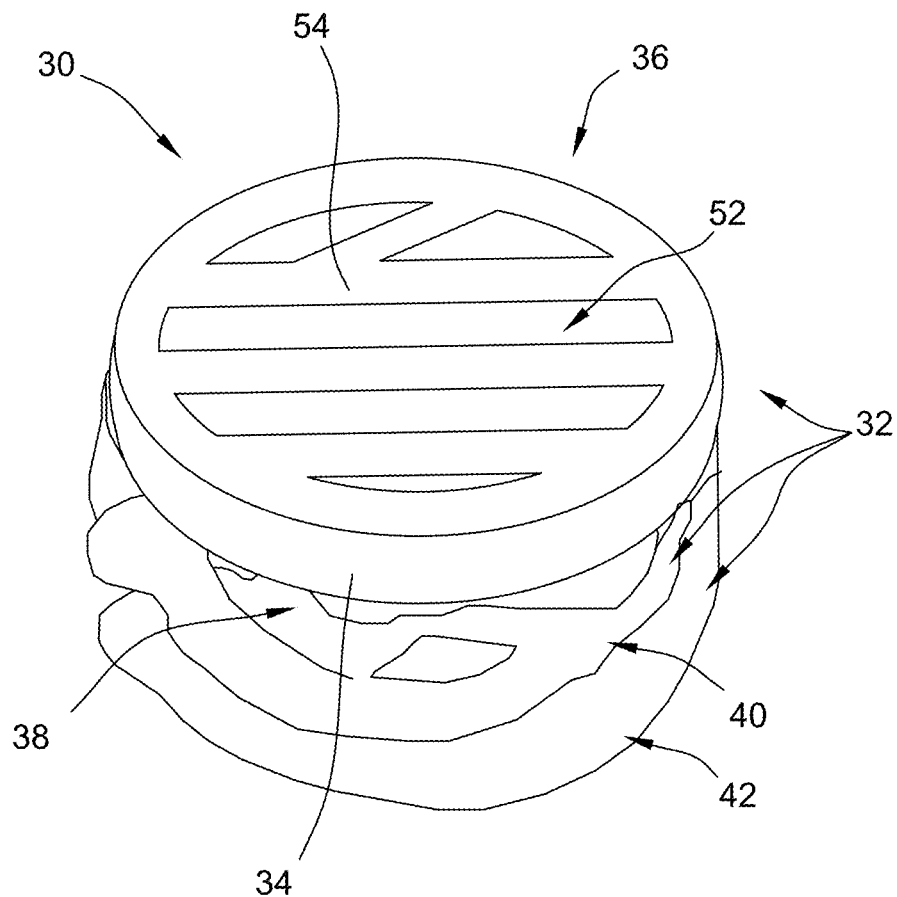
FIG. 3 is a perspective view of the additively manufactured structure shown in FIG. 2.

FIG. 2 is a top view of a structure 30 formed using an additive manufacturing system. FIG. 3 is a perspective view of the additively manufactured structure 30. The additively manufactured structure 30 includes a plurality of layers 32 and a material 34 formed from a binder and an active agent.

In the exemplary embodiment, the active agent is configured to cause a reaction when exposed to a reactant and includes a metal such as a metal oxide, a group II metal carbonate, and/or a metal nanoparticle. For example and without limitation, the active agent may include copper oxide, chromium oxide, nickel oxide, titanium oxide, tungsten oxide, magnesium oxide (derived from calcined magnesium carbonate), calcium oxide (derived from calcined calcium carbonate), porous carbon, silicon dioxide, yttrium oxide, molybdenum oxide, zirconium oxide, zinc oxide, gallium oxide, vanadium oxide, niobium oxide, iron oxide, indium oxide, tin oxide, lanthanum oxide, copper nanoparticles, aluminum oxide, cerium oxide, manganese oxide, cobalt oxide, lead oxide, cadmium oxide, rhodium oxide, scandium oxide, technetium oxide, ruthenium oxide, rhenium oxide, tantalum oxide, germanium oxide, thallium oxide, iridium oxide, palladium nanoparticles, palladium oxide, gold nanoparticles, silver nanoparticles, silver oxide, platinum nanoparticles, barium oxide (derived from calcined barium carbonate), strontium oxide (calcined strontium carbonate), and/or beryllium oxide (derived from calcined beryllium carbonate). As a result, the additively manufactured structure 30 is configured for use in reactionary processes such as a reactionary process involving catalytic conversion.

The material 34 may have a higher loading of the active agent than materials of an incipient impregnation process because the active agent is directly printed in the material 34. Accordingly, the structure 30 is precisely customizable to provide desired reactive characteristics. For example, in some embodiments, the material 34 has a loading of the active agent that is greater than 10%. In some embodiments, the material 34 has a loading of the active agent that is in a range of about 15% to about 85%. In addition, the structure 30 may have greater disbursement of the active agent and improved activity during a reactionary process because the active agent is directly printed in the material 34 and is not formed from a precursor in the material 34.

In addition, the active agent may be insoluble and may include particles that are sized to combine with the binder and facilitate printing of the metal. For example, the active agent may include particles having a diameter in a range of about 0.05 micrometers to about 100 micrometers. In some embodiments, the active agent includes particles having a diameter in a range of about 0.05 micrometers to about 0.1 micrometers. The smaller particles may provide better fluidity for printing the material 34.

The material 34 may include bentonite, kaolinite clay, and/or any other suitable binder. In the exemplary embodiment, bentonite is used as a binder in the material 34 to provide increased adhesion and strength for the additively manufactured structure 30.

The material 34 may also include a catalyst component and/or a dispersion solvent. For example and without limitation, the catalyst component may include zeolite socony mobil-5 (ZSM-5), porous carbon, silicon dioxide, metal oxide, and/or metal nanoparticles. For example and without limitation, the dispersion solvent may include distilled water and/or alcohol.

In some embodiments, the material 34 includes a plasticizer such as methylcellulose and/or a co-binder such as polyvinyl alcohol. In alternative embodiments, the material 34 may include any components that enable the material 34 to function as described herein.

In the exemplary embodiment, the additively manufactured structure 30 includes a first layer 36, a second layer 38, a third layer 40, and a fourth layer 42. In the illustrated embodiment, the additively manufactured structure 30 includes at least four layers each including the material 34. In alternative embodiments, the additively manufactured structure 30 may include any layer that enables the additively manufactured structure to function as described herein. For example, in some embodiments, at least one layer 32 of the additively manufactured structure 30 includes a second material.

The layers 32 are arranged in a stacked configuration such that the material of each layer 32 is in contact with and adhered to the material of an adjacent layer(s) 32 (i.e., each layer 32 contacts a layer that is above or below the layer). In the exemplary embodiment, the layers 32 are adhered together such that the layers 32 are permanently joined together, i.e., the layers 32 cannot be separated without damaging the additively manufactured structure 30. Accordingly, the additively manufactured structure 30 is a monolith and may be more durable than other structures that include separate components attached together. In addition, the additively manufactured structure 30 may be more compact than at least some known structures for reactionary processes.

The additively manufactured structure 30 is configured to provide a reaction when the additively manufactured structure 30 is exposed to at least one reactant. The reaction is caused by the active agent in the material 34 being exposed to a reactant. In the exemplary embodiment, the active agent of the additively manufactured structure 30 is in an unreduced state and includes a metal oxide, a group II metal carbonate, and/or a metal nanoparticle. The active agent is configured to provide a catalytic conversion of at least one reactant during the at least one reactionary process.

In some embodiments, the additively manufactured structure 30 is constructed for use in an adsorption process. For example, the additively manufactured structure 30 may be configured to receive a fluid flow including at least two gasses and process the fluid flow to remove at least one of the gasses. Specifically, the material 34 may be configured to absorb a first gas from the fluid flow. Accordingly, a second gas will be left in the fluid flow after reactions with the additively manufactured structure 30. The first gas may be removed from the additively manufactured structure 30 by temperature control or any other suitable desorption process.

Each layer 32 of the additively manufactured structure 30 has a lattice or grid shape and defines a plurality of channels 52 extending through the thickness of the layer. For example, the first layer 36 includes ribs 54 extending longitudinally in the Z-direction and spaced apart in the X-direction to define the channels 52 therebetween. The second layer 38 includes ribs 56 extending longitudinally in the X-direction and spaced apart in the Z-direction to define the channels 52 therebetween. The channels 52 are in flow communication with each other and form a plurality of fluid flow paths for fluid to flow through the additively manufactured structure 30. The fluid may include one or more reactants that interact with the material 34 as the fluid flows through the channels.

The grid patterns in adjacent layers 32 are offset such that the channels 52 define tortuous flow paths through the additively manufactured structure 30. For example, in the illustrated embodiment, the grid pattern of the first layer 36 is offset from the grid pattern of the second layer 38 by 90°, i.e., the ribs 54 are perpendicular to the ribs 56. The third, fifth, and seventh layers each include the same grid pattern as the first layer 36. The fourth, sixth, and eighth layers each include the same grid pattern as the second layer 38. Accordingly, the channels 52 are at least partly occluded by the ribs 54, 56 in an adjacent layer 32 to form the tortuous flow paths. The tortuous flow paths may increase the contact between the reactants entrained in the fluid flow and the material 34. In alternative embodiments, the layers 32 may have any patterns that enable the additively manufactured structure 30 to function as described herein. For example, in some embodiments, each layer 32 includes a plurality of cells or cells of unconventional geometric designs such as rhombohedral, trigonal, or open cellular configurations. For example, FIGS. 18-21 illustrate different configurations of additively manufactured structures 300, 302, 304, 306. The additively manufactured structure 300 shown in FIG. 18 includes at least 200 cells per square inch arranged in a grid pattern. The additively manufactured structure 302 shown in FIG. 19 includes an open geometric design with trigonal channels. The additively manufactured structure 304 shown in FIG. 20 includes at least 400 cells per square inch arranged in a grid pattern. The additively manufactured structure 306 shown in FIG. 21 includes at least 600 cells per square inch arranged in a grid pattern.

Referring to FIGS. 1-3, in the illustrated embodiment, the additively manufactured structure 30 is a cylinder. The shape and size of the additively manufactured structure 30 may allow the additively manufactured structure to fit within an apparatus for a reactionary process such as in a conduit for fluid flow. The shape and size of the additively manufactured structure 30 may be precisely controlled and customized for specific applications because the additively manufactured structure 30 is fabricated using an additive manufacturing process which does not have the same design constraints as other methods to fabricate structures. In alternative embodiments, the additively manufactured structure 30 may have any shape that enables the multi-material structure to function as described herein.

Figure 4:
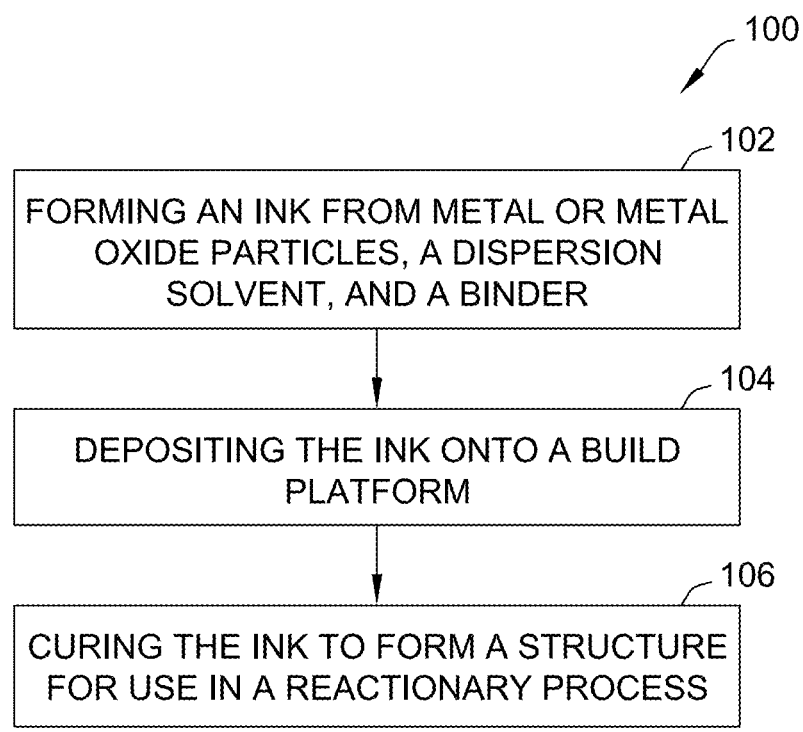
FIG. 4 is a flow chart of an example method of fabricating an additively manufactured structure including metal or metal oxide particles.

FIG. 4 is a flow chart of an example method 100 of fabricating an additively manufactured structure such as the structure 12 (shown in FIG. 1), the additively manufactured structure 30 (shown in FIG. 2), and the multi-material structure 200 (shown in FIG. 6). With reference to FIGS. 1-4, the method 100 includes forming 102 an ink (e.g., the material 34) from metal or metal oxide particles, a dispersion solvent, and a binder. For example, in some embodiments, the ink is formed by mixing the active agent in a solvent including the binder to form a paste.

The metal or metal oxide particles are configured to cause a reaction when exposed to a reactant. For example and without limitation, the metal or metal oxide particles may include copper oxide, chromium oxide, nickel oxide, titanium oxide, tungsten oxide, magnesium oxide (derived from calcined magnesium carbonate), calcium oxide (derived from calcined calcium carbonate), porous carbon, silicon dioxide, yttrium oxide, molybdenum oxide, zirconium oxide, zinc oxide, gallium oxide, vanadium oxide, niobium oxide, iron oxide, indium oxide, tin oxide, lanthanum oxide, copper nanoparticles, aluminum oxide, cerium oxide, manganese oxide, cobalt oxide, lead oxide, cadmium oxide, rhodium oxide, scandium oxide, technetium oxide, ruthenium oxide, rhenium oxide, tantalum oxide, germanium oxide, thallium oxide, iridium oxide, palladium nanoparticles, palladium oxide, gold nanoparticles, silver nanoparticles, silver oxide, platinum nanoparticles, barium oxide (derived from calcined barium carbonate), strontium oxide (calcined strontium carbonate), and/or beryllium oxide (derived from calcined beryllium carbonate). In some embodiments, the first material includes more than one metal.

The method 100 may allow for an increased oxide loading in the material because the metal or metal oxide particles are in the material during printing and are not formed by treating the structure after printing. For example, the structure may include a loading of the active agent in the material that is greater than 10%. In some embodiments, the loading of the active agent in the material is in a range of about 15% to about 85%.

The method 100 includes depositing 104 the ink onto a build platform (e.g., the build platform 14). In some embodiments, the method 100 includes depositing two or more layers onto the build platform. The layers may be deposited in a desired shape such as a grid pattern on the build platform.

The method 100 includes curing 106 the ink to form a structure (e.g., the structure 30) for use in a reactionary process. The cured structure includes the metal or metal oxide particles and is configured to provide a reaction when exposed to a reactant. The structure may be cured 106 by placing the structure in a controlled environment for a selected time. The temperature, pressure, moisture content and other environmental characteristics may be controlled during the curing process. In some embodiments, the method 100 includes heat treating the structure. Heat treating the structure may control the curing process for the ink. When the ink is cured, the structure may be a solid monolith structure. In addition or alternatively, heat treating the structure may provide a desired characteristic to the structure such as a hardness. In alternative embodiments, the structure may undergo any suitable treatment processes.

In some embodiments, the structure may be heated to calcine the binder in the ink. For example, the structure may be heated at a controlled rate to a selected temperature. The selected temperature may be equal to or greater than the calcination temperature of the binder. In some embodiments, the structure is heated in a two stage process to prevent collapse of the structure and/or burnout of the active agent in the material. For example, the structure may be heated to a first temperature and maintained isothermally at the first temperature for at least a selected time. After the selected time, the structure may be heated to a second temperature greater than the first temperature. The structure may be cured prior to heating to calcine the binder. When the ink is cured and the binder is calcined, the structure may be a solid monolith structure with an upper limit of metal or metal oxide loading of, for example, 85 percentage weight. The structure may include pores formed by the calcined binder.

In some embodiments, the structure is formed with metal particles and the structure is heated in an inert atmosphere instead of calcination to prevent reoxidation of the metal particles.

Figure 5:
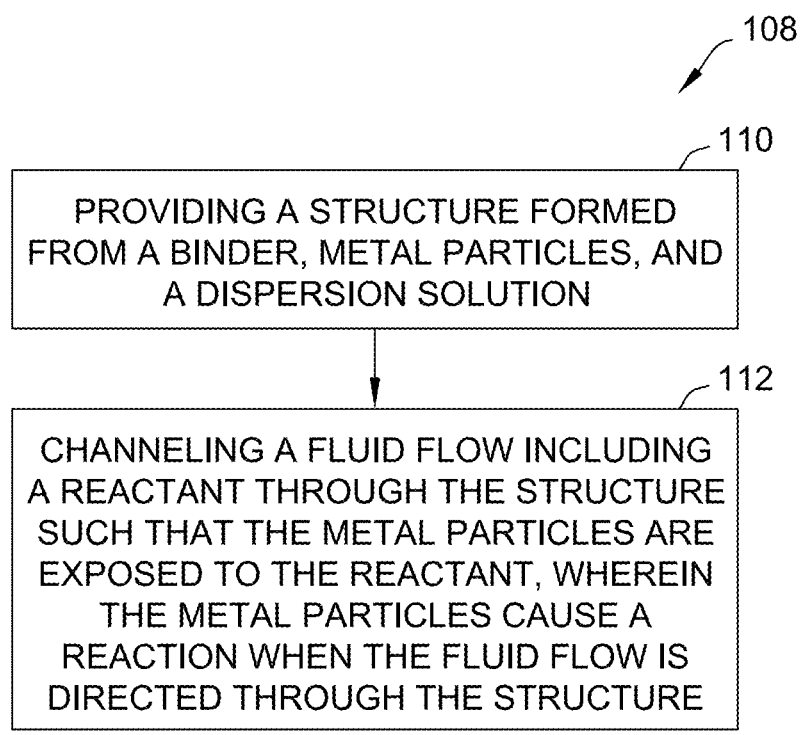
FIG. 5 is a flow chart of an example method of using an additively manufactured structure in a reactionary process.

FIG. 5 is a flow chart of an example method 108 of using an additively manufactured structure such as the structure (shown in FIG. 1), the additively manufactured structure 30 (shown in FIG. 2), and the multi-material structure 200 (shown in FIG. 6) in a reactionary process. With reference to FIGS. 2, 3, and 5, the method 108 includes providing 110 an additively manufactured structure (e.g., the structure 30) formed from a binder, a dispersion solvent, and an active agent. The active agent may include metal or metal oxide particles that are configured to provide a reaction when the additively manufactured structure is exposed to a reactant. For example, the active agent may include a metal oxide, a group II metal carbonate, and/or a metal nanoparticle.

The method 108 includes channeling 112 a fluid flow including at least one reactant through the structure such that the metal or metal oxide particles are exposed to the reactant. The metal or metal oxide particles cause a reaction when the fluid flow is directed through the structure. Accordingly, the method 108 can be used for reactionary processes including, for example and without limitation, carbon dioxide reduction, oxidative dehydrogenation of propane, n-hexane cracking, and methanol (MeOH) conversion to dimethyl ether (DME). The additively manufactured structure used in the method 108 may have a higher loading percentage of metal or metal oxide particles than other additively manufactured structures because the particles are directly printed in the additive manufacturing process. Also, the additively manufactured structures used in the method 108 may be resistant to deactivation (e.g., coking) and have a higher conversion rate and higher selectivity during the reactionary process than previous structures because the additively manufactured structures include the metal or metal oxide particles and are able to be precisely tuned for the reactions. In addition, the insoluble metal particles are suspended within the structure as opposed to formed them by impregnation and the suspended particles may enhance the contact between the heterogeneous active sites (i.e., ZSM-5 and the metal particles). As a result, retention of dentate compounds is reduced on the surface, thereby enhancing the stability of the catalyst and the reactant conversion and desired product selectivity.

Figure 7:
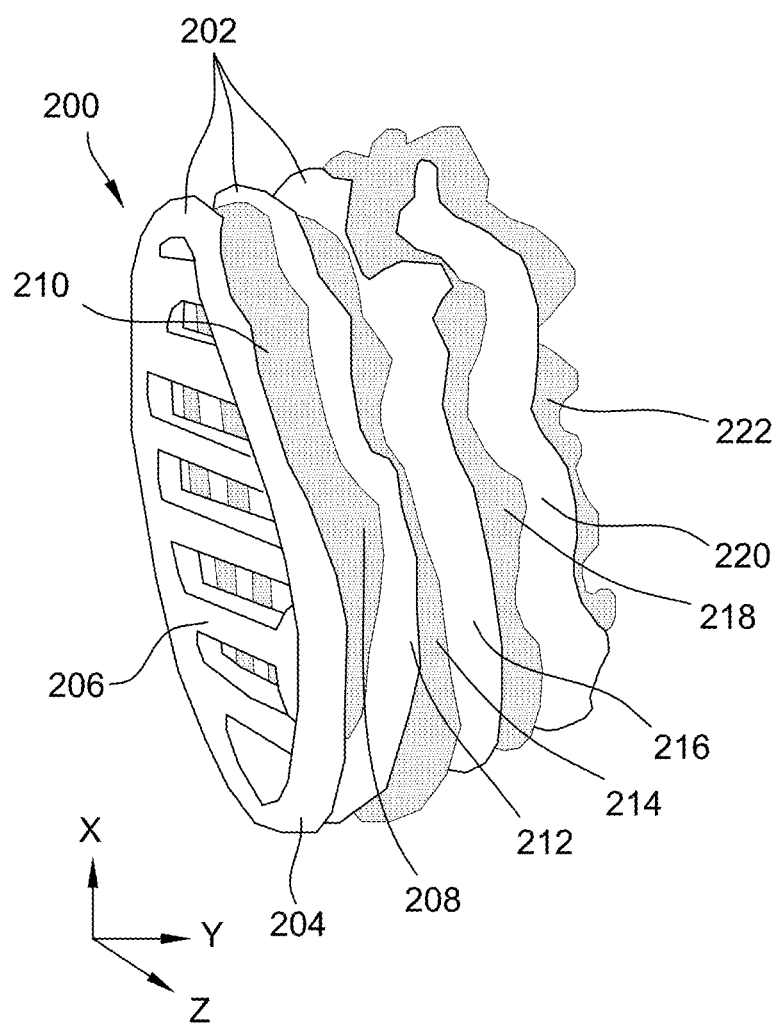
FIG. 7 is a perspective view of the multi-material structure shown in FIG. 6.

FIG. 6 is a top view of a multi-material structure 200 formed using an additive manufacturing system. FIG. 7 is a perspective view of the multi-material structure 200. The multi-material structure 200 includes a plurality of layers 202 and two or more different materials. Accordingly, the multi-material structure 200 is able to provide simultaneous reactions when exposed to at least one reactant. As a result, the multi-material structure 200 is configured for use in reactionary processes involving multiple reactions and is able to provide multiple reactions when the multi-material structure is exposed to one or more reactants.

The multi-material structure 200 includes a plurality of materials in a plurality of layers 202. For example, the multi-material structure 200 includes a first layer 204 including a first material 206 formed from a first binder and a first active agent, and a second layer 208 including a second material 210 formed from a second binder and a second active agent. The first active agent and/or the second active agent may include metal or metal oxide particles. For example, the first active agent and/or the second active agent may comprise a metal oxide, a group II metal carbonate, and/or a metal nanoparticle.

In addition, the multi-material structure 200 includes a third layer 212, a fourth layer 214, a fifth layer 216, a sixth layer 218, a seventh layer 220, and an eighth layer 222. In the exemplary embodiment, each layer 202 includes the first material 206 or the second material 210. Specifically, the materials 206, 210 in the layers 202 are arranged in an alternating pattern (e.g., the first, third, fifth, and seventh layers include the first material 206, and the second, fourth, sixth, and eighth layers include the second material 210). In the illustrated embodiment, the multi-material structure 200 includes eight layers. In alternative embodiments, the multi-material structure 200 may include any layer that enables the multi-material structure to function as described herein. For example, in some embodiments, the multi-material structure 200 includes at least one layer including a third material formed from a third binder and a third active agent. In further embodiments, at least one of the layers 202 includes the first material 206 and the second material 210.

The multi-material structure 200 is configured to provide multiple reactions when the multi-material structure 200 is exposed to at least one reactant. For example, the first material 206 has a first property that provides a first reaction during the at least one reactionary process. The first reaction is caused by the first active agent in the first material 206 being exposed to a reactant. For example, in some embodiments, the first agent is configured to absorb at least one reactant during the at least one reactionary process. In further embodiments, the first active agent is configured to provide a catalytic conversion of at least one reactant during the at least one reactionary process. In alternative embodiments, the first material 206 provides any reaction that enables the multi-material structure 200 to function as described herein.

The second material 210 has a second property that provides a second reaction during the at least one reactionary process. The second reaction is caused by the second active agent in the second material 210 being exposed to a reactant. For example, in some embodiments, the second agent is configured to absorb at least one reactant during the at least one reactionary process. In further embodiments, the second active agent is configured to provide a catalytic conversion of at least one reactant during at least one reactionary process.

In the exemplary embodiment, at least one of the first active agent and the second active agent includes metal or metal oxide particles that are configured to cause a reaction when exposed to a reactant. The particles are directly printed in the first material 206 and/or the second material 210 and the cured multi-material structure 200 includes the particles. The metal or metal oxide particles in the multi-material structure 200 are unreduced and are configured to cause a reaction when exposed to a reactant.

In some embodiments, the multi-material structure 200 is a photocatalyst and at least one of the first material 206 and the second material 210 is configured to interact with light. In alternative embodiments, the multi-material structure 200 provides any reaction that enables the multi-material structure 200 to function as described herein.

In further embodiments, the multi-material structure 200 is constructed for use in a multi-component adsorption process. For example, the multi-material structure 200 may be configured to receive a fluid flow including at least three gasses and process the fluid flow to remove at least two of the gasses. Specifically, the first material 206 may be configured to absorb a first gas from the fluid flow and the second material 210 may be configured to absorb a second gas from the fluid flow. Accordingly, a third gas will be left in the fluid flow after reactions with the multi-material structure 200. The first and second gasses may be removed from the multi-material structure 200 by temperature control or any other suitable desorption process.

Figure 8:
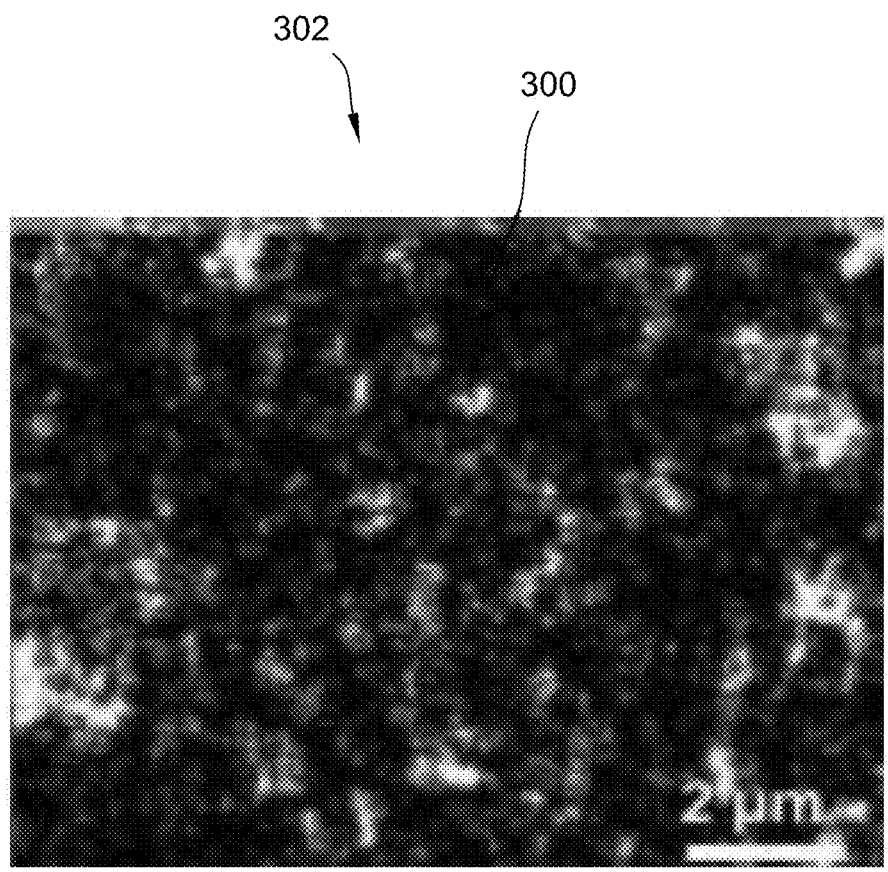
FIG. 8 is an enlarged view of a portion of a surface of an example reactive structure formed from an ink including metal or metal oxide particles.

FIG. 8 is an enlarged view of a portion of a surface 300 of an example reactive structure 302 formed from a paste including metal or metal oxide particles. For example, the reactive structure includes gallium oxide particles. The surface 300 has a relatively even dispersion of crystalline phases because the metal or metal oxide particles are directly printed in the paste which causes the metal or metal oxide particles to be disbursed relatively evenly throughout the structure 302. Moreover, the surface 300 of the structure 302 exhibits less clustering than structures formed using incipient impregnation. Additionally, the structure 302 provides enhanced catalytic activity during the reactionary process because accessibility of active sites in the structure 302 is increased in comparison to structures formed using incipient impregnation.

Example

In one embodiment, additively manufactured structures were formed using the additive manufacturing system 10 (shown in FIG. 1). A first additively manufactured structure was fabricated using zeolite socony mobile-5 (ZSM-5) as a catalyst and gallium oxide ($Ga_2O_3$) as an active agent. A second additively manufactured structure was fabricated using ZSM-5 as a catalyst and zirconium oxide (ZrO) as an active agent. A third additively manufactured structure was fabricated using ZSM-5 as a catalyst and vanadium pentoxide ($V_2O_5$) as an active agent. A fourth additively manufactured structure was fabricated using ZSM-5 as a catalyst and chromium oxide ($Cr_2O_3$) as an active agent. A fifth additively manufactured structure was fabricated using ZSM-5 as a catalyst and gallium oxide, zirconium oxide, vanadium pentoxide, and chromium oxide as active agents. Initially, the ZSM-5 was activated. Binders and solvents were selected for each of the materials. For example, bentonite clay (BC) was used as an inorganic binder and methylcellulose (MC) was used as a plasticizing organic binder. Deionized (DI) water or DI water mixed with methanol (MeOH) was used as a solvent. Table 1 provides the weight and percentages for the binders, active agents, and catalyst for each additively manufactured structure.

TABLE 1

| Monolith | $Cr_2O_3$ (wt. %) | $Ga_2O_3$ (wt. %) | $V_2O_5$ (wt. %) | ZrO (wt. %) | H-ZSM-5 (wt. %) | Bentonite (wt. %) | Methylcellulose (wt. %) |
|---|---|---|---|---|---|---|---|
| ZSM-5/Ga[15] | 0.0 | 12.7 | 0.0 | 0.0 | 72.0 | 12.7 | 2.5 |
| ZSM-5/Zr[15] | 0.0 | 0.0 | 12.7 | 0.0 | 72.0 | 12.7 | 2.5 |
| ZSM-5/V[15] | 0.0 | 0.0 | 0.0 | 12.7 | 72.0 | 12.7 | 2.5 |
| ZSM-5/Cr[15] | 12.7 | 0.0 | 0.0 | 0.0 | 72.0 | 12.7 | 2.5 |
| ZSM-5/MMO | 4.2 | 8.5 | 8.5 | 8.5 | 55.1 | 12.7 | 2.5 |

The catalyst (ZSM-5), active agents ($Ga_2O_3$, ZrO, $V_2O_5$, and $Cr_2O_3$), and binders (BC and MC) were dispersed into respective solvent mixtures to form a paste. For example, the components were mixed with distilled water inside of a polytetrafluoroethylene (PTFE) bottle until the powders dispersed and formed a paste. The pastes were then rolled at 20 rpm for 48 hours at 25° Celsius (C) to achieve binding. Additional solvent (e.g., about 3-5 drops of DI water) was mixed in the pastes to prepare the pastes for extrusion (e.g., provide proper fluidity of the pastes).

An additive manufacturing system (e.g., an aluminum prusa I3A pro 3D printer sold by Geetech Electronics Inc.) was used to form the structures. CAD software was used to design the monolith structures and a controller was used to read the generated CAD files and control operation of the printer. The pastes were loaded into separate syringes for extrusion. For example, about 3 to 10 cubic centimeters (cc) were loaded into each syringe. A piston head was placed into each syringe after the syringe was loaded with the paste. When the printer was ready to deposit each material onto the build platform, a pressurized air flow having a pressure in a range of 0-5 bar (depending on viscosity of the material) was supplied to the syringe to extrude the material through a 0.85 mm nozzle connected to the syringe.

The materials were deposited in a series of layers to form the desired height and shape of each structure. For example, a syringe was connected to the printer and used to deposit each layer of the material. The layers were formed with unit cells defining a plurality of apertures. Each layer included approximately 100 cells per square inch (cpsi). The completed structures each had a height of approximately 1.5 centimeters (cm).

The structures underwent heat treating to prevent cracking and improve strength. Specifically, the structures were dried at ambient temperature overnight at 25° C. and then heated to 750° C. for 6 hours to calcinate the structures. Once cooled, the composites were removed from the build platform and calcined to form monolithic structures including unreduced metal oxides. Accordingly, the samples provided unitary structures which were configured to provide desired reactions when the structures were exposed to a reactant.

The structures were used for a reactionary process including n-hexane cracking to determine reactive properties. Tables 2 and 3 show reactive properties of the structures. For example, the additively manufactured structures were activated with 150 mL/min air at 750° C. for 1 hour. The activated structures were exposed to 30 mL/min of hexane/$N_2$ fluid flow for 6 hours at temperatures of 550° C. (Table 2) and 600° C. (Table 3). An outlet product stream was analyzed every 30 min using a gas chromatograph, equipped with flame ionization and thermal conductivity detectors. The hexane conversion rates and the selectivity for products of the cracking reaction were determined for each structure, as shown in Tables 2 and 3.

TABLE 2

| Monolith | Hexane Conversion (%) | Product | Product Selectivity (%) |
|---|---|---|---|
| ZSM-5/Ga[15] | 45-49 | Methane | 17-20 |
| | | Ethane | 5-10 |
| | | Propane | 2 |
| | | Butane | 0 |
| | | $C_{5+}$ | 0 |
| | | BTX | 2-10 |
| | | Ethylene | 20-23 |
| | | Propylene | 28-29 |
| | | Butene | 3 |
| ZSM-5/V[15] | 30-31 | Methane | 32-65 |
| | | Ethane | 5-12 |
| | | Propane | 0 |
| | | Butane | 2-5 |
| | | $C_{5+}$ | 0 |
| | | BTX | 5-7 |
| | | Ethylene | 22-29 |
| | | Propylene | 9-15 |
| | | Butene | 1-3 |
| ZSM-5/Zr[15] | 45-49 | Methane | 12-29 |
| | | Ethane | 9-10 |
| | | Propane | 0-1 |
| | | Butane | 7 |
| | | $C_{5+}$ | 0 |
| | | BTX | 2-10 |
| | | Ethylene | 19-25 |
| | | Propylene | 29-30 |
| | | Butene | 3-4 |
| ZSM-5/Cr[15] | 79-85 | Methane | 10-23 |
| | | Ethane | 10-11 |
| | | Propane | 2-3 |
| | | Butane | 4-5 |
| | | $C_{5+}$ | 0 |
| | | BTX | 0 |
| | | Ethylene | 22-29 |
| | | Propylene | 38-40 |
| | | Butene | 3 |
| ZSM-5/MMO | 35-45 | Methane | 5-55 |
| | | Ethane | 4-5 |
| | | Propane | 0 |
| | | Butane | 5-11 |
| | | $C_{5+}$ | 0 |
| | | BTX | 2-3 |
| | | Ethylene | 10-30 |
| | | Propylene | 20-40 |
| | | Butene | 0 |

TABLE 3

| Monolith | Hexane Conversion (%) | Product | Product Selectivity (%) |
|---|---|---|---|
| ZSM-5/Ga[15] | 60-62 | Methane | 18 |
| | | Ethane | 8 |
| | | Propane | 0 |
| | | Butane | 5 |
| | | $C_{5+}$ | 0 |
| | | BTX | 14-15 |
| | | Ethylene | 28-29 |
| | | Propylene | 24-25 |
| | | Butene | 3 |
| ZSM-5/V[15] | 19-25 | Methane | 18-19 |
| | | Ethane | 9-10 |
| | | Propane | 0-1 |
| | | Butane | 14-15 |
| | | $C_{5+}$ | 0-3 |
| | | BTX | 0 |
| | | Ethylene | 33 |
| | | Propylene | 20-21 |
| | | Butene | 0-1 |
| ZSM-5/Zr[15] | 49-58 | Methane | 12-15 |
| | | Ethane | 5-9 |
| | | Propane | 0-2 |
| | | Butane | 3-5 |
| | | $C_{5+}$ | 0 |
| | | BTX | 9-15 |
| | | Ethylene | 25-31 |
| | | Propylene | 24-29 |
| | | Butene | 2-3 |
| ZSM-5/Cr[15] | 51-52 | Methane | 19-21 |
| | | Ethane | 8-9 |
| | | Propane | 0-1 |
| | | Butane | 5 |
| | | $C_{5+}$ | 0-1 |
| | | BTX | 5-8 |
| | | Ethylene | 27-29 |
| | | Propylene | 29-30 |
| | | Butene | 3-5 |
| ZSM-5/MMO | 38-49 | Methane | 20-24 |
| | | Ethane | 10-11 |
| | | Propane | 0 |
| | | Butane | 0-5 |
| | | $C_{5+}$ | 0 |
| | | BTX | 0-3 |
| | | Ethylene | 28-33 |
| | | Propylene | 25-27 |
| | | Butene | 3-4s |

Table 4 (below) provides the turnover frequency (TOF) and the hexane reaction rate per catalyst surface area. The TOF was calculated using Equation (1).

$$TOF = \frac{n_{c6H14} \times \text{Hexane Conversion} \times M_i}{g_{catalyst} \times X_i} \quad \text{Equation (1)}$$

where $n_{c3H14}$ is the molar flow rate of hexane, $M_i$ is the catalyst molecular weight, and $X_i$ is the weight fraction of the catalyst in the printed monolith.

The hexane reaction rate per catalyst surface area was calculated using Equation (2).

$$Q_{C6H14} = \frac{101325 \text{ Pa} \times 0.21 \times 30 \frac{\text{mL}}{\text{min}}}{8.314 \frac{\text{kg} \times \text{m}^2}{\text{K} \times \text{mol} \times \text{s}^2} \times 1000 \frac{\text{mL}}{\text{m}3}} \quad \text{Equation (2)}$$

$$\text{Rate} = \frac{Q_{C3H8} \times \text{Hexane Conversion} \times g_{catalyst}}{S_{BET}} \quad \text{Equation (3)}$$

where the molar flowrate of hexane ($Q_{c6H14}$, mol/min) was derived from the ideal gas law, $S_{BET}$ is the catalyst surface area from $N_2$ physisorption, and $g_{catalyst}$ is the weight of the sample used in each reaction.

TABLE 4

| Monolith | Temperature (° C.) | TOF ($s^{-1}$) | Reaction Rate × $10^3$ (mol $C_6H_{14}$/ min · $m^2$cat.) |
|---|---|---|---|
| ZSM-5/Ga[15] | 550 | 5.38 | 2.4 |
| | 600 | 4.76 | 3.0 |
| ZSM-5/V[15] | 550 | 9.11 | 47.7 |
| | 600 | 12.43 | 38.5 |
| ZSM-5/Zr[15] | 550 | 8.68 | 2.4 |
| | 600 | 11.58 | 2.8 |
| ZSM-5/Cr[15] | 550 | 16.55 | 4.7 |
| | 600 | 11.17 | 2.9 |
| ZSM-5/MMO | 550 | 6.30 | 9.9 |
| | 600 | 6.46 | 10.8 |

The additively manufactured structures provide examples of customizable heterogeneous catalysts. The additively manufactured structures in the example provided high conversion rates and high selectivity for hexane cracking. Moreover, the additively manufactured structures may be produced at scale using additive manufacturing processes.

Example

In one embodiment, additively manufactured structures were formed using the additive manufacturing system 10 (shown in FIG. 1). A first additively manufactured structure was fabricated using zeolite socony mobile-5 (ZSM-5) as a catalyst and gallium oxide ($Ga_2O_3$) and zirconium oxide (ZrO) as active agents. A second additively manufactured structure was fabricated using ZSM-5 as a catalyst and gallium oxide and vanadium pentoxide ($V_2O_5$) as active agents. A third additively manufactured structure was fabricated using ZSM-5 as a catalyst and zirconium oxide and gallium oxide as active agents. A fourth additively manufactured structure was fabricated using ZSM-5 as a catalyst and gallium oxide, zirconium oxide, and vanadium pentoxide as active agents. Initially, the ZSM-5 was activated. Binders and solvents were selected for each of the materials. For example, bentonite clay (BC) was used as an inorganic binder and methylcellulose (MC) was used as a plasticizing organic binder. Deionized (DI) water or DI water mixed with methanol (MeOH) was used as a solvent. Table 5 provides the weight and percentages for the binders, active agents, and catalyst for each additively manufactured structure.

polytetrafluoroethylene (PTFE) bottle until the powders dispersed and formed a paste. The mixtures were then rolled at 20 rpm for 48 hours at 25° Celsius (C) to achieve binding. The mixtures were densified at 50° C. and 300 rpm to generate pastes.

An additive manufacturing system (e.g., an aluminum prusa I3A pro 3D printer sold by Geetech Electronics Inc.) was used to form the structures. CAD software was used to design the monolith structures and a controller was used to read the generated CAD files and control operation of the printer. The pastes were loaded into separate syringes for extrusion. For example, about 3 to 10 cubic centimeters (cc) were loaded into each syringe. A piston head was placed into each syringe after the syringe was loaded with the paste. When the printer was ready to deposit each material onto the build platform, a pressurized air flow having a pressure in a range of 0-5 bar (depending on viscosity of the material) was supplied to the syringe to extrude the material through a 0.85 mm nozzle connected to the syringe.

The materials were deposited in a series of layers to form the desired height and shape of each structure. For example, a syringe was connected to the printer and used to deposit each layer of the material. The layers were formed with unit cells defining a plurality of apertures. Each layer included approximately 100 cells per square inch (cpsi). The completed structures each had a height of approximately 1.5 centimeters (cm).

The structures underwent heat treating to prevent cracking and improve strength. Specifically, the structures were dried at ambient temperature overnight at 25° C. and then heated to 750° C. for 6 hours to calcinate the structure and burn out the methylcellulose. Once cooled and dried, the composites were removed from the build platform and calcined to form a monolithic structure including unreduced metal oxide. Accordingly, the samples provided unitary structures which were configured to provide desired reactions when the structures were exposed to a reactant.

The structures were used for a reactionary process including an oxidative dehydrogenation of propane (ODHP) reaction. For example, the additively manufactured structures were activated with 150 mL/min air at 750° C. for 1 hour. The activated structures were exposed to 60 mL/min of feed gas fluid flow for 6 hours at temperatures of 550° C. The feed gas included 2.5 mol % propane and 5 mol % of carbon dioxide balanced with dinitrogen. An outlet product stream was analyzed every 30 min using a gas chromatograph,

TABLE 5

| Monolith | $Ga_2O_3$ (wt. %) | $V_2O_5$ (wt. %) | ZrO (wt. %) | H-ZSM-5 (wt. %) | Bentonite (wt. %) | Methylcellulose (wt. %) |
|---|---|---|---|---|---|---|
| ZSM-5/Ga[15]/Zr[15] | 12.3 | 0.0 | 12.3 | 58.2 | 15.1 | 2.1 |
| ZSM-5/V[15]/Ga[15] | 12.3 | 12.3 | 0.0 | 58.2 | 15.1 | 2.1 |
| ZSM-5/Zr[15]/Ga[15] | 0.0 | 12.3 | 12.3 | 58.2 | 15.1 | 2.1 |
| ZSM-5/Ga[10]/Zr[15]/V[15] | 8.2 | 8.2 | 8.2 | 58.2 | 15.1 | 2.1 |

The catalyst (ZSM-5), active agents ($Ga_2O_3$, ZrO, and $V_2O_5$), and binders (BC and MC) were dispersed into respective solvent mixtures to form a paste. For example, the components were mixed with distilled water inside of a equipped with flame ionization and thermal conductivity detectors. The reactive properties for oxidative dehydrogenation of propane were determined for each structure. Table 6 shows reactive properties of the reactive structures.

TABLE 6

| Monolith | $C_3H_8$ Conversion (%) | $CO_2$ Conversion (%) | $C_3H_6$ Selectivity (%) | $C_2H_4$ Selectivity (%) | $CH_4$ Selectivity (%) | TOF ($s^{-1}$) | Reaction Rate × $10^5$ (kmol/$g_{cat}$s) |
|---|---|---|---|---|---|---|---|
| ZSM-5/$Ga_{15}$/$Zr_{15}$ | 36.7 | 46.5 | 88.2 | 6.3 | 5.5 | 0.011 | 4.6 |
| ZSM-5/$V_{15}$/$Ga_{15}$ | 38.8 | 48.7 | 58.9 | 26.6 | 14.5 | 0.016 | 5.1 |
| ZSM-5/$Zr_{15}$/$Ga_{15}$ | 37.7 | 48.2 | 89.5 | 5.1 | 5.4 | 0.014 | 4.8 |
| ZSM-5/$Ga_{10}$/$Zr_{10}$/$V_{10}$ | 37.2 | 47.7 | 85.9 | 8.0 | 6.1 | 0.013 | 4.7 |

The additively manufactured structures in the example provided high conversion rates and high selectivity for catalytic reactions. Accordingly, the additively manufactured structures provide examples of customizable heterogeneous catalysts.

Example

In one embodiment, additively manufactured structures were formed using the additive manufacturing system 10 (shown in FIG. 1). A first additively manufactured structure was fabricated using zeolite socony mobile-5 (ZSM-5) as a catalyst and gallium oxide ($Ga_2O_3$) as an active agent. A second additively manufactured structure was fabricated using ZSM-5 as a catalyst and vanadium pentoxide ($V_2O_5$) as an active agent. A third additively manufactured structure was fabricated using ZSM-5 as a catalyst and zirconium oxide as an active agent. A fourth additively manufactured structure was fabricated using ZSM-5 as a catalyst and chromium oxide ($Cr_2O_3$) as an active agent. A fifth additively manufactured structure was fabricated using ZSM-5 as a catalyst and gallium oxide, zirconium oxide, and vanadium pentoxide as active agents. In addition, a sixth structure was fabricated using H-ZSM-5 without a separate active agent. Initially, the ZSM-5 was activated. Binders and solvents were selected for each of the materials. For example, bentonite clay (BC) was used as an inorganic binder and methylcellulose (MC) was used as a plasticizing organic binder. Deionized (DI) water or DI water mixed with methanol (MeOH) was used as a solvent. Table 7 provides the weight and percentages for the binders, active agents, and catalyst for each additively manufactured structure.

design the monolith structures and a controller was used to read the generated CAD files and control operation of the printer. The pastes were loaded into separate syringes for extrusion. For example, about 3 to 10 cubic centimeters (cc) were loaded into each syringe. A piston head was placed into each syringe after the syringe was loaded with the paste. When the printer was ready to deposit each material onto the build platform, a pressurized air flow having a pressure in a range of 0-5 bar (depending on viscosity of the material) was supplied to the syringe to extrude the material through a 0.85 mm nozzle connected to the syringe.

The materials were deposited in a series of layers to form the desired height and shape of each structure. For example, a syringe was connected to the printer and used to deposit each layer of the material. The layers were formed with unit cells defining a plurality of apertures. Each layer included approximately 100 cells per square inch (cpsi). The completed structures each had a height of approximately 1.5 centimeters (cm).

The structures underwent heat treating to prevent cracking and improve strength. Specifically, the structures were dried at ambient temperature overnight at 25° C. and then heated to 750° C. for 6 hours to calcinate the structure and burn out the methylcellulose. Once cooled and dry, the composites were removed from the build platform and calcined to form monolithic structures including unreduced metal oxide. Accordingly, the samples provided unitary structures which were configured to provide desired reactions when the structures were exposed to a reactant.

The structures were used for a reactionary process including carbon dioxide reduction in tandem with oxidative dehydrogenation of propane (ODHP). For example, the

TABLE 7

| Monolith | $Cr_2O_3$ (wt. %) | $Ga_2O_3$ (wt. %) | $V_2O_5$ (wt. %) | ZrO (wt. %) | H-ZSM-5 (wt. %) | Bentonite (wt. %) | Methylcellulose (wt. %) |
|---|---|---|---|---|---|---|---|
| ZSM-5/$Ga_{15}$ | 0.0 | 12.7 | 0.0 | 0.0 | 72.0 | 12.7 | 2.5 |
| ZSM-5/$V_{15}$ | 0.0 | 0.0 | 12.7 | 0.0 | 72.0 | 12.7 | 2.5 |
| ZSM-5/$Zr_{15}$ | 0.0 | 0.0 | 0.0 | 12.7 | 72.0 | 12.7 | 2.5 |
| ZSM-5/$Cr_{15}$ | 12.7 | 0.0 | 0.0 | 0.0 | 72.0 | 12.7 | 2.5 |
| ZSM-5/$Ga_{10}$/$Zr_{10}$/$V_{10}$ | 4.2 | 8.5 | 8.5 | 8.5 | 55.1 | 12.7 | 2.5 |
| H-ZSM-5 | 0.0 | 0.0 | 0.0 | 0.0 | 82.5 | 14.5 | 2.9 |

The catalyst (ZSM-5), active agents ($Cr_2O_3$, $Ga_2O_3$, ZrO, and $V_2O_5$), and binders (BC and MC) were dispersed into respective solvent mixtures to form a paste. For example, the components were mixed with distilled water inside of a polytetrafluoroethylene (PTFE) bottle until the powders dispersed and formed a paste. The pastes were then rolled at 20 rpm for 48 hours at 25° Celsius (C) to achieve binding.

An additive manufacturing system (e.g., an aluminum prusa I3A pro 3D printer sold by Geetech Electronics Inc.) was used to form the structures. CAD software was used to additively manufactured structures were activated with 150 mL/min air at 750° C. for 1 hour. The activated structures were exposed to 60 mL/min of feed gas fluid flow for 6 hours at temperatures of 550° C. The feed gas included 2.5 mol % propane and 5 mol % of carbon dioxide balanced with dinitrogen. An outlet product stream was analyzed every 30 min using a gas chromatograph, equipped with flame ionization and thermal conductivity detectors. The conversion rates and the selectivity for products of the reaction were determined for each structure, as shown in Table 8.

TABLE 8

| Monolith | $C_3H_8$ Conversion (%) | $CO_2$ Conversion (%) | Product | Product Selectivity (%) | TOF ($s^{-1}$) | Reaction Rate × $10^3$ ($mol_{C3H6}min^{-1}m^{-2}_{cat.}$) |
|---|---|---|---|---|---|---|
| ZSM-5/$Ga_{15}$ | 37 | 60-70 | Propylene | 57 | 0.010 | 8.1 |
| | | | Ethene | 25 | | |
| | | | Methane | 18 | | |
| | | | BTX | 0 | | |
| ZSM-5/$V_{15}$ | 38-40 | 48 | Propylene | 81 | 0.011 | 11.8 |
| | | | Ethene | 18 | | |
| | | | Methane | 1 | | |
| | | | BTX | 0 | | |
| ZSM-5/$Zr_{15}$ | 35 | 45-50 | Propylene | 96 | 0.010 | 435.7 |
| | | | Ethene | 4 | | |
| | | | Methane | 0 | | |
| | | | BTX | 0 | | |
| ZSM-5/$Cr_{15}$ | 36-40 | 50 | Propylene | 85 | 0.011 | 15.1 |
| | | | Ethene | 6 | | |
| | | | Methane | 9 | | |
| | | | BTX | 0 | | |
| ZSM-5/$Ga_{10}$/$Zr_{10}$/$V_{10}$ | 39 | 50 | Propylene | 95-97 | 0.009 | 62.6 |
| | | | Ethene | 3-5 | | |
| | | | Methane | 0-2 | | |
| | | | BTX | 0 | | |
| H-ZSM-5 | 20-30 | 35 | Propylene | 25-50 | 0.008 | 79.6 |
| | | | Ethene | 15-25 | | |
| | | | Methane | 25-60 | | |
| | | | BTX | 0 | | |

The propane conversion, the $CO_2$ conversion, and the hydrocarbon (HC) selectivity were calculated using Equations (4), (5), and (6), respectively.

$$\text{Propane conversion (\%)} = \frac{C_3H_{8_{in}} - C_3H_{8_{out}}}{C_3H_{8_{in}}} \times 100 \quad \text{Equation (4)}$$

$$CO_2 \text{ conversion (\%)} = \frac{CO_{2_{in}} - CO_{2_{out}}}{CO_{2_{in}}} \times 100 \quad \text{Equation (5)}$$

$$HC \text{ selectivity (\%)} = \frac{HC_{out}}{C_3H_{6_{out}} + CH_{4_{out}} + C_2H_{4_{out}} + BTX_{out}} \quad \text{Equation (6)}$$

where $HC_{out}$ refers to desired hydrocarbon molar flow in the outlet stream, $C_3H_{8_{in}}$ refers to propane molar flow in the inlet stream, $C_3H_{8_{out}}$ refers to propane molar flow in the outlet stream, $CO_{2_{in}}$ refers to carbon dioxide molar flow in the inlet stream, $CO_{2_{out}}$ refers to carbon dioxide molar flow in the outlet stream, $C_3H_{6_{out}}$ refers to methyl ethylene molar flow in the outlet stream, $CH_{4_{out}}$ refers to methane molar flow in in outlet stream, $C_2H_{4_{out}}$ refers to acetylene in the outlet stream, and $BTX_{out}$ refers to benzene toulene exylene mixture in the outlet stream. All of the parameters in the equations were in molar flow rate of the individual compounds. The monolith's average molecular weights were considered to be the weighted average of the individual component's molecular weights based on their calcined fractions.

Table 8 also provides the turnover frequency (TOF) and the reaction rate per catalyst surface area. The TOF was calculated using Equation (7).

$$TOF = \frac{n_{c3H8} \times \text{Propane Conversion} \times M_i}{g_{catalyst} \times X_i} \quad \text{Equation (7)}$$

where $n_{c3H8}$ is the molar flow rate of propane, $M_i$ is the catalyst molecular weight, and $X_i$ is the weight fraction of the catalyst in the printed monolith.

The reaction rate per catalyst surface area was calculated using Equations (8) and (9).

$$Q_{C3H8} = \frac{101325 \text{ Pa} \times 0.025 \times 60 \frac{mL}{min}}{8.314 \frac{kg \times m^2}{K \times mol \times s^2}} \quad \text{Equation (8)}$$

$$\text{Rate} = \frac{Q_{C3H8} \times \text{Propane Conversion} \times C3H6 \text{ Selectivity} \times g_{catalyst}}{S_{BET} \times 10000} \quad \text{Equation (9)}$$

where the molar flowrate of propane ($Q_{c3H8}$, mol/min) was derived from the ideal gas law, $S_{BET}$ is the catalyst surface area from $N_2$ physisorption, and $g_{catalyst}$ is the weight of the sample used in each reaction.

The additively manufactured structures in the example provided high conversion rates and high selectivity for catalytic reactions. In addition, the additively manufactured structures experienced little to no coking. In contrast, catalysts formed by incipient impregnation can experience significant coking which effects the reaction processes that the catalyst are used for. Accordingly, in contrast to catalyst formed by incipient impregnation, the described additively manufactured structures are precisely customizable within a larger range of potential oxide loadings and provide more efficient catalytic reactions.

Example

In one embodiment, additively manufactured structures were formed using the additive manufacturing system 10 (shown in FIG. 1). A first additively manufactured structure was fabricated using zeolite socony mobile-5 (ZSM-5) as a catalyst without an active agent. A second additively manufactured structure was fabricated using ZSM-5 as a catalyst and gallium oxide ($Ga_2O_3$) as an active agent. A third additively manufactured structure was fabricated using ZSM-5 as a catalyst and gallium oxide and zirconium oxide (ZrO) as active agents. A fourth additively manufactured structure was fabricated using ZSM-5 as a catalyst and gallium oxide and vanadium pentoxide ($V_2O_5$) as active agents. Initially, the ZSM-5 was activated. Binders and solvents were selected for each of the materials. For example, bentonite clay (BC) was used as an inorganic binder and methylcellulose (MC) was used as a plasticizing organic binder. Deionized (DI) water or DI water mixed with methanol (MeOH) was used as a solvent. Table 9 provides the weight and percentages for the binders, active agents, and catalyst for each additively manufactured structure.

TABLE 9

| Monolith | $Ga_2O_3$ (wt. %) | $ZrO_2$ (wt. %) | $V_2O_5$ (wt. %) | H-ZSM-5 (wt. %) | Bentonite (wt. %) | Methylcellulose (wt. %) |
|---|---|---|---|---|---|---|
| ZSM-5 | 0 | 0 | 0 | 84.8 | 12.7 | 2.5 |
| ZSM-5/$Ga_4$ | 3.4 | 0 | 0 | 81.4 | 12.7 | 2.5 |
| ZSM-5/$Ga_4$/$Zr_4$ | 3.4 | 3.4 | 0 | 78 | 12.7 | 2.5 |
| ZSM-5/$Ga_4$/$V^4$ | 3.4 | 0 | 3.4 | 78 | 12.7 | 2.5 |

The catalyst (ZSM-5), active agents ($Ga_2O_3$, ZrO, $V_2O_5$, and $Cr_2O_3$), and binders (BC and MC) were dispersed into respective solvent mixtures to form a paste. For example, the components were mixed with distilled water inside of a polytetrafluoroethylene (PTFE) bottle until the powders dispersed and formed a paste. The pastes were then rolled at 20 rpm for 48 hours at 25° Celsius (C) to achieve binding. Additional solvent (e.g., about 3-5 drops of DI water) was mixed in the pastes to prepare the pastes for extrusion (e.g., provide proper fluidity of the pastes).

An additive manufacturing system (e.g., an aluminum prusa I3A pro 3D printer sold by Geetech Electronics Inc.) was used to form the structures. CAD software was used to design the monolith structures and a controller was used to read the generated CAD files and control operation of the printer. The pastes were loaded into syringes for extrusion. For example, about 3 to 10 cubic centimeters (cc) were loaded into each syringe. A piston head was placed into each syringe after the syringe was loaded with the paste. When the printer was ready to deposit each material onto the build platform, a pressurized air flow having a pressure in a range of 0-5 bar (depending on viscosity of the material) was supplied to the syringe to extrude the material through a 0.85 mm nozzle connected to the syringe.

The materials were deposited in a series of layers to form the desired height and shape of each structure. For example, a syringe was connected to the printer and used to deposit each layer of the material. The layers were formed with unit cells defining a plurality of apertures. Each layer included approximately 100 cells per square inch (cpsi). The completed structures each had a height of approximately 1.5 centimeters (cm).

The structures underwent heat treating to prevent cracking and improve strength. Specifically, the structures were dried at ambient temperature overnight at 25° C. and then heated to 550° C. for 6 hours to calcinate the structure. Once cooled and dry, the composites were removed from the build platform and calcined to form monolithic structures including unreduced metal oxide. Accordingly, the samples provided unitary structures which were configured to provide desired reactions when the structures were exposed to a reactant.

The structures were used for a reactionary process including methanol (MeOH) conversion to dimethyl ether (DME).

Table 10 shows reactive properties of the reactive structures. For example, the additively manufactured structures were pretreated with 30 mL/min air at 500° C. for 2 hours. The structures were then exposed to 30 mL/min of $N_2$ fluid flow for 5 hours at temperatures of 200° C., 300° C. and 400° C. An outlet product stream was analyzed every 30 min using a gas chromatograph, equipped with a flame ionization detector. The reactive properties for a reactionary process including methanol conversion to dimethyl ether were determined for each structure, as shown in Table 10.

TABLE 10

| Sample | Reaction Temperature (° C.) | MeOH Conversion | DME Selectivity | Reaction Rate × $10^3$ ($mol_{DME}$/ min · $m^2$ catalyst) |
|---|---|---|---|---|
| ZSM-5 | 200 | 69.2 | 80.6 | 7.3 |
|  | 300 | 81.1 | 25.0 | 2.7 |
|  | 400 | 86.8 | 20.0 | 2.3 |
| $Ga_4$/ ZSM-5 | 200 | 85.2 | 73.9 | 9.6 |
|  | 300 | 90.5 | 39.0 | 5.4 |
|  | 400 | 96.5 | 38.6 | 5.7 |
| $Ga_4$—$Zr_4$/ ZSM-5 | 200 | 81.9 | 25.0 | 3.3 |
|  | 300 | 84.1 | 24.6 | 3.4 |
|  | 400 | 71.4 | 1.1 | 0.1 |
| $Ga_4$—$V_4$/ ZSM-5 | 200 | 81.4 | 32.3 | 4.9 |
|  | 300 | 82.5 | 30.3 | 4.7 |
|  | 400 | 62.7 | 2.9 | 0.3 |

The reaction rates per catalyst surface area were calculated by Equation 10:

$$\text{Rate} = \frac{WHSV \times \text{MeOH Conversion} \times DME \text{ Selectivity} \times 60 \text{ min} \times 1 \text{ mol MeOH}}{10,000 \times S_{BET} \times 1 \text{ h} \times 32.04 \text{ } g_{MeOH}} \quad \text{Equation (10)}$$

where WHSV is the weight hour space velocity, and $S_{BET}$ is the monoliths' surface areas gathered from $N_2$ physisorption.

The additively manufactured structures provided high conversion rates and high selectivity for the tested reactionary processes. In addition, the structures had a stability and were resistant to deactivation. For example, the structures did not experience coking even when exposed for 6 hours.

Example

In one embodiment, additively manufactured structures were formed using the additive manufacturing system 10 (shown in FIG. 1). A first additively manufactured structure was fabricated using CaO derived from calcined $CaCO_3$ and ZSM-5 as catalysts without an active agent. A second additively manufactured structure was fabricated using CaO derived from calcined $CaCO_3$ and ZSM-5 as catalysts and $In_2O_3$ as an active agent. A third additively manufactured structure was fabricated using CaO derived from calcined $CaCO_3$ and ZSM-5 as catalysts and $CeO_2$ as an active agent.

A fourth additively manufactured structure was fabricated using CaO derived from calcined $CaCO_3$ and ZSM-5 as catalysts and $MoO_3$ as an active agent. A fifth additively manufactured structure was fabricated using CaO derived from calcined $CaCO_3$ and ZSM-5 as catalysts and $Cr_2O_3$ as an active agent. Initially, the ZSM-5 and CaO derived from calcined $CaCO_3$ were activated. Binders and solvents were selected for each of the materials. For example, bentonite clay (BC) was used as an inorganic binder and methylcellulose (MC) was used as a plasticizing organic binder. Deionized (DI) water or DI water mixed with methanol (MeOH) was used as a solvent. Table 11 provides the weight and percentages for the binders, active agents, and catalyst for each additively manufactured structure.

TABLE 11

| Sample | ZSM-5 (wt. %) | $CaCO_3$ (wt. %) | Bentonite Clay (wt. %) | Methyl-cellulose (wt. %) | $In_2O_3$ (wt. %) | $CeO_2$ (wt. %) | $MoO_3$ (wt. %) | $Cr_2O_3$ (wt. %) |
|---|---|---|---|---|---|---|---|---|
| CaO—ZSM-5 | 29.0 | 59.0 | 10.0 | 2.0 | 0.0 | 0.0 | 0.0 | 0.0 |
| CaO—In@ZSM-5 | 27.4 | 55.5 | 9.1 | 1.9 | 6.1 | 0.0 | 0.0 | 0.0 |
| CaO—Ce@ZSM-5 | 27.4 | 55.5 | 9.1 | 1.9 | 0.0 | 6.1 | 0.0 | 0.0 |
| CaO—Mo@ZSM-5 | 27.4 | 55.5 | 9.1 | 1.9 | 0.0 | 0.0 | 6.1 | 0.0 |
| CaO—Cr@ZSM-5 | 27.4 | 55.5 | 9.1 | 1.9 | 0.0 | 0.0 | 0.0 | 6.1 |

The catalyst ($CaCO_3$ and ZSM-5), active agents ($In_2O_3$, $CeO_2$, $MbO_3$, and $Cr_2O_3$), and binders (BC and MC) were dispersed into respective solvent mixtures to form a paste. For example, the components were mixed with distilled water inside of a polytetrafluoroethylene (PTFE) bottle until the powders dispersed and formed a paste. The pastes were then rolled at 60 rpm for 48 hours at 25° Celsius (C) to achieve binding. Additional solvent (e.g., about 3-5 drops of DI water) was mixed in the pastes to prepare the pastes for extrusion (e.g., provide proper fluidity of the pastes).

An additive manufacturing system (e.g., an aluminum prusa I3A pro 3D printer sold by Geetech Electronics Inc.) was used to form the structures. CAD software was used to design the monolith structures and a controller was used to read the generated CAD files and control operation of the printer. The pastes were loaded into syringes for extrusion. For example, about 3 to 10 cubic centimeters (cc) were loaded into each syringe. A piston head was placed into each syringe after the syringe was loaded with the paste. When the printer was ready to deposit each material onto the build platform, a pressurized air flow having a pressure in a range of 0-5 bar (depending on viscosity of the material) was supplied to the syringe to extrude the material through a 0.85 mm nozzle connected to the syringe.

The materials were deposited in a series of layers to form the desired height and shape of each structure. For example, a syringe was connected to the printer and used to deposit each layer of the material. The layers were formed with unit cells defining a plurality of apertures. Each layer included approximately 100 cells per square inch (cpsi). The completed structures each had a height of approximately 1.5 centimeters (cm).

The structures underwent heat treating to prevent cracking and improve strength. Specifically, the structures were dried at ambient temperature for 12 hours at 25° C. and then heated to 550° C. for 6 hours to calcinate the structure. Once cooled and dried, the composites were removed from the build platform and calcined to form monolithic structures including unreduced metal oxide. Accordingly, the samples provided unitary structures which were configured to provide desired reactions when the structures were exposed to a reactant.

The structures were used for a reactionary process including adsorption and catalytic conversion reactions. FIGS. 9-14 and Table 12 show reactive properties of the reactive structures. For example, the additively manufactured structures were exposed to 20 mL/min of Ar and heated at 10° C./min to 700° C. under gas for hour to desorb $CO_2$ and activate the CaO adsorbent. Next, the environment of the additively manufactured structures was cooled to 600° C. and 20 mL/min of 10% $CO_2$/Ar was allowed to flow into the system for 1 h to saturate the adsorbent phase upon reaching the target temperature. Then, the system was heated at 10° C./min to the desired reaction temperature (600, 650 or 700° C.) while maintaining a flow of $CO_2$. Once reaching the desired temperature, the flow of $CO_2$ was terminated and 20 mL/min of 5% $C_3H_8$/Ar was delivered into the reactor. The concentration profiles of the species were collected with an MKS Cirrus II Mass Spectrometer throughout the entirety of the experiment, and the $CO_2$ adsorption capacities of the different samples were assessed with thermogravimetric analysis (TGA) on a Q500 thermogravimetric gas analyzer (TGA). Therein, the samples were heated at 10° C./min to 750° C. with exposure to 40 mL/min of $N_2$ to remove $CO_2$ from the CaO phase. After 1 h, the system was cooled to 600° C. and 60 mL/min of 10% $CO_2$/$N_2$ was passed over the sample for 90 min.

Figure 9:
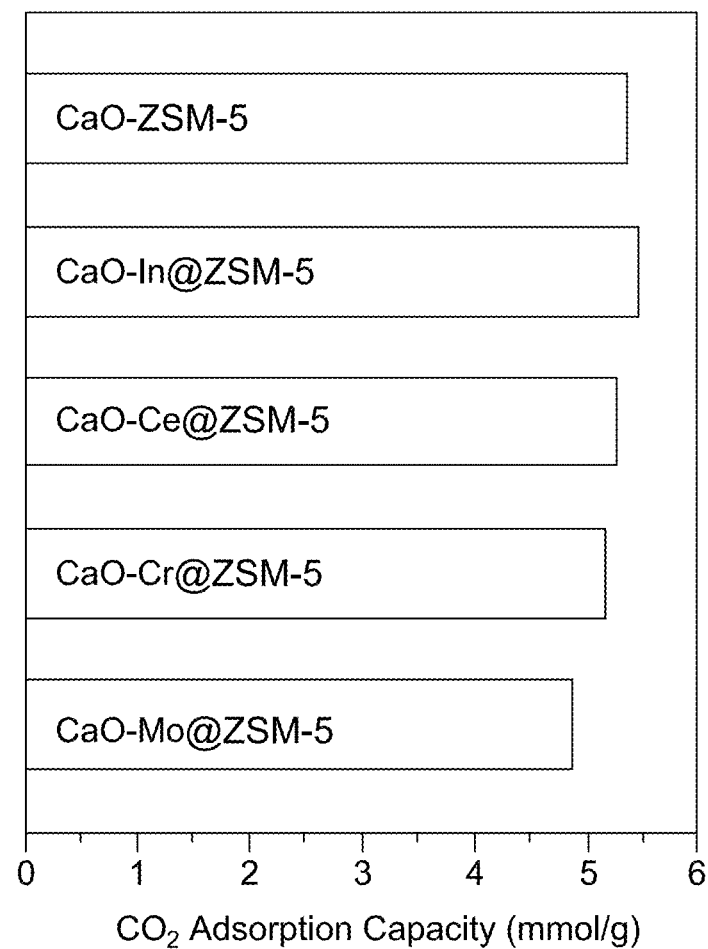
FIG. 9 is a bar graph illustrating $CO_2$ adsorption capacity for additively manufactured structures including composite dual-functional absorbent-catalyst materials.
Figure 10:
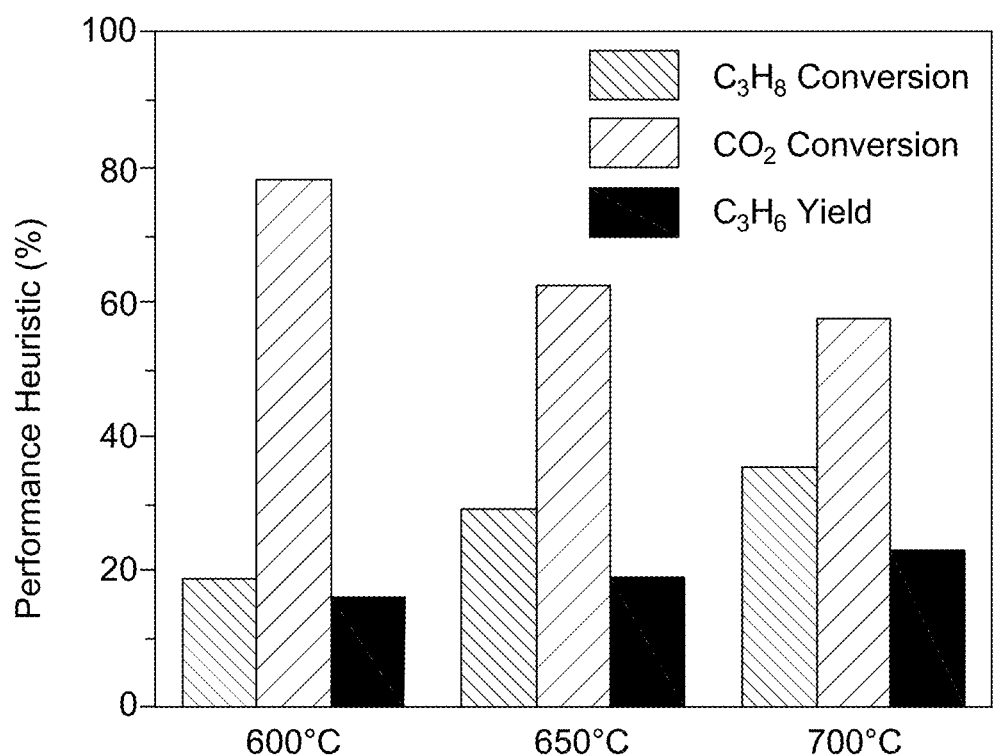
FIG. 10 is a bar graph illustrating reactionary performance in adsorption/catalysis reactions for CaO-ZSM-5 (undoped).
Figure 11:
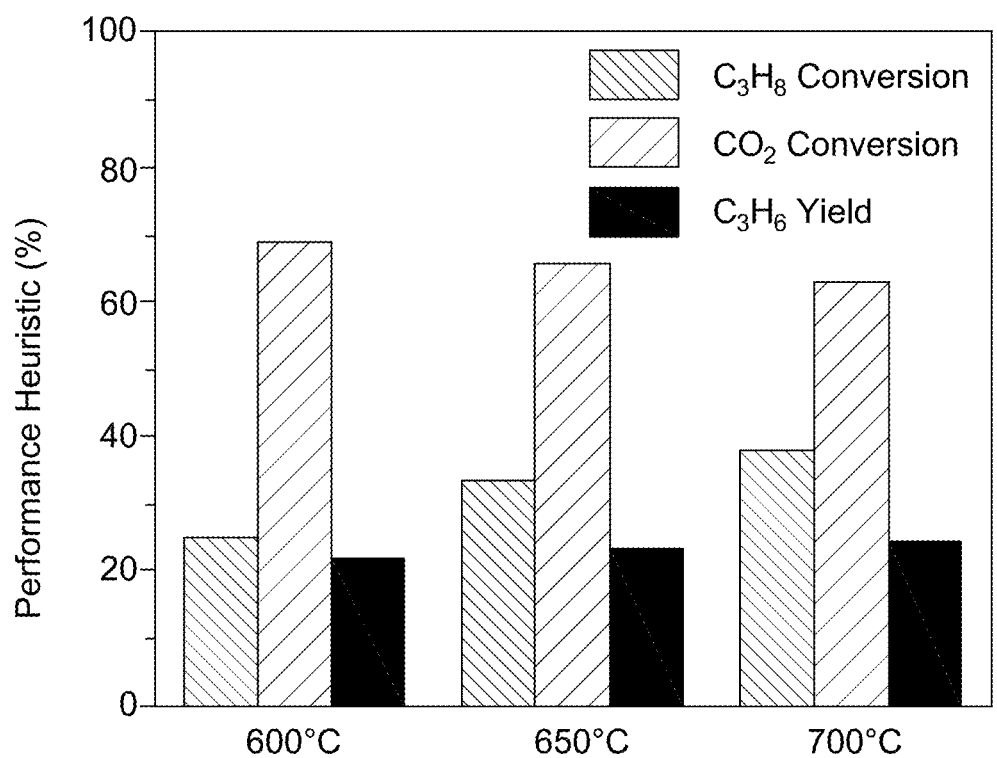
FIG. 11 is a bar graph illustrating reactionary performance in adsorption/catalysis reactions for CaO-ZSM-5 (In).
Figure 12:
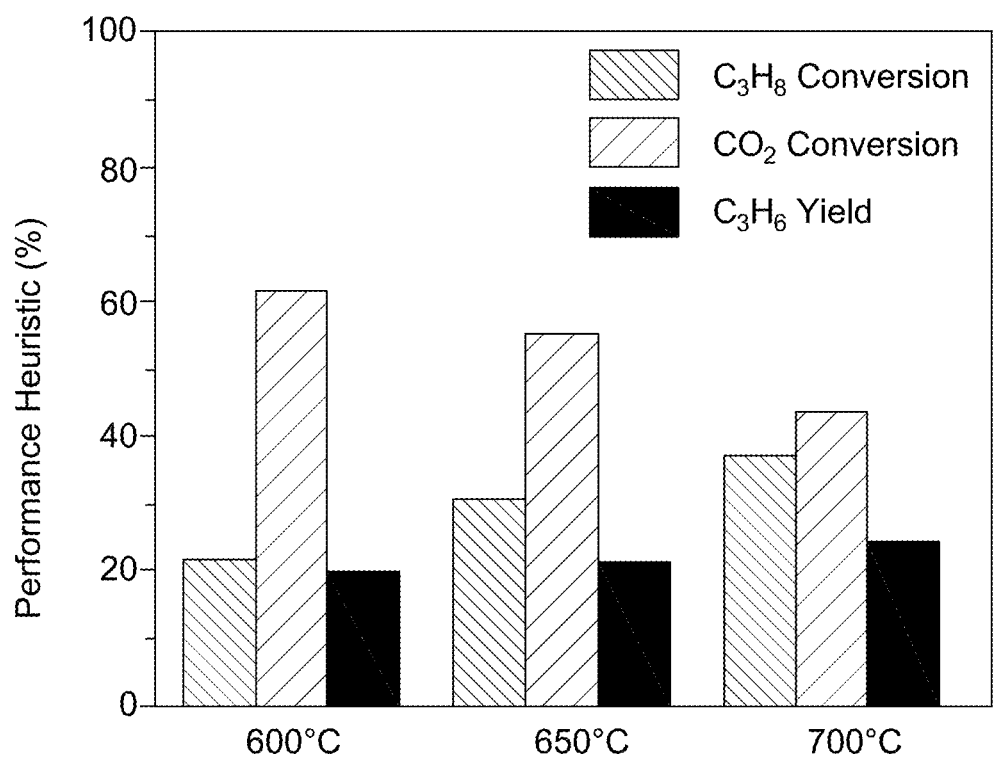
FIG. 12 is a bar graph illustrating reactionary performance in adsorption/catalysis reactions for CaO-ZSM-5 (Ce).
Figure 13:
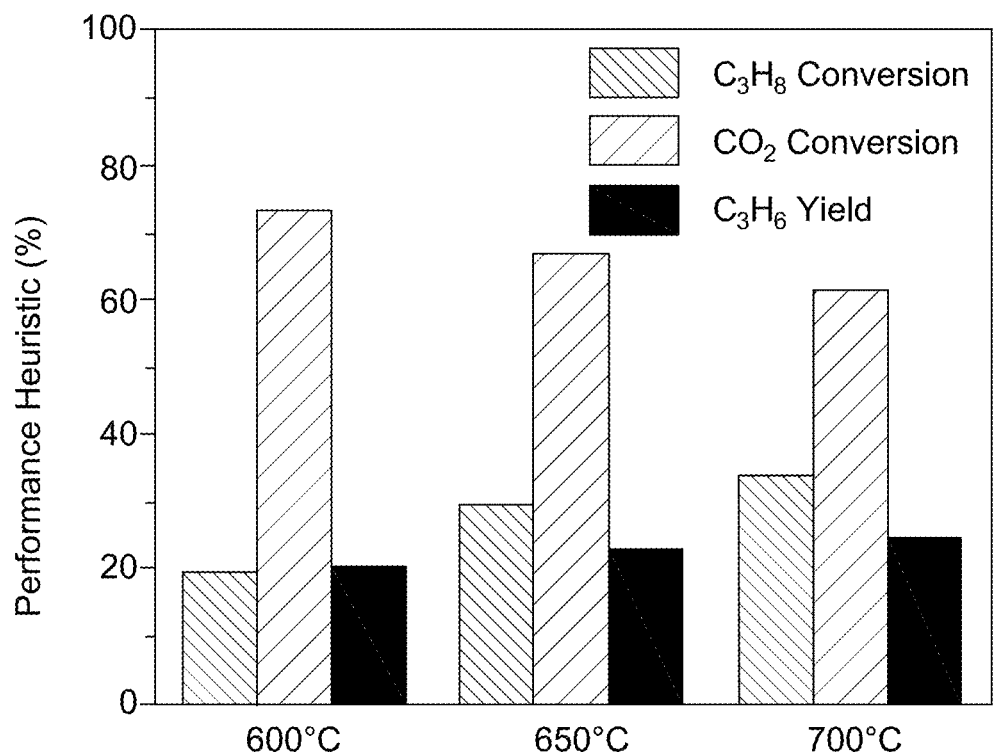
FIG. 13 is a bar graph illustrating reactionary performance in adsorption/catalysis reactions for CaO-ZSM-5 (Mo).
Figure 14:
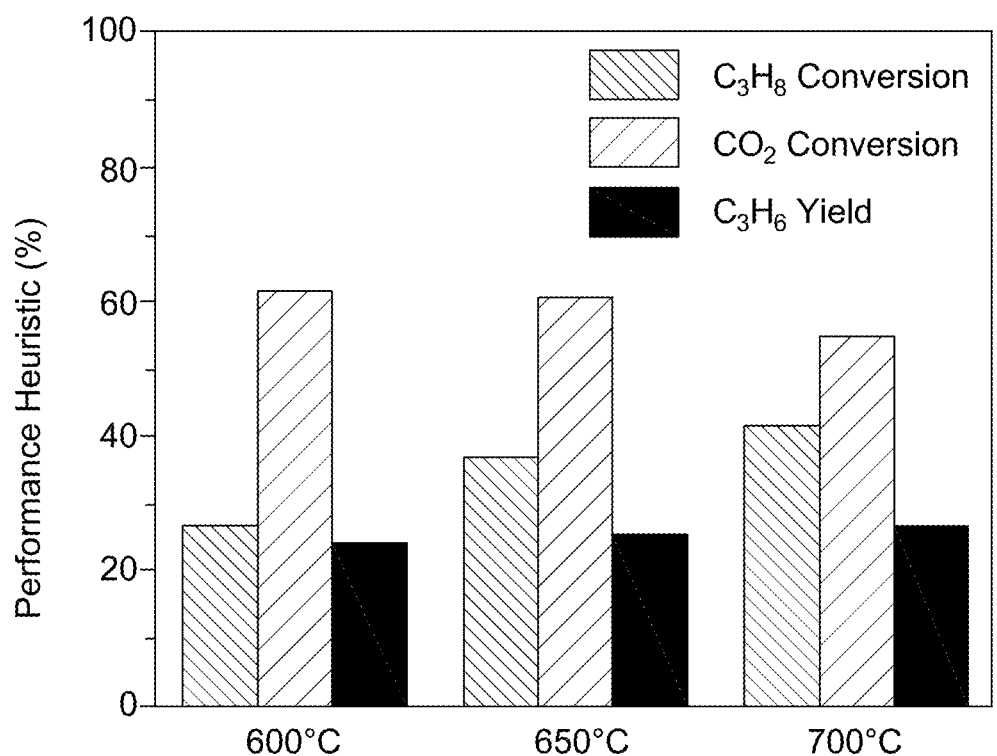
FIG. 14 is a bar graph illustrating reactionary performance in adsorption/catalysis reactions for CaO-ZSM-5 (Cr).

FIGS. 9-14 illustrate the adsorption and catalysis results for the additively manufactured structures. Specifically, FIG. 9 is a bar graph indicating the $CO_2$ adsorption capacities of the additively manufactured structures. The additively manufactured structures displayed adsorption capacities of 5.0-5.2, signifying that there were minimal effects from the metal dopants on the affinity for $CO_2$. The additively manufactured structures displayed higher propane conversion but reduced $CO_2$ conversion and propylene yield as the temperature was increased. Also, the additively manufactured structures demonstrated that combined adsorption/catalysis for ODHP can occur solely at 600° C. Performing ODHP over the additively manufactured structures reduces or eliminates the adsorption and catalysis thermal swing, and, thereby, enhances process output and lowers the energy requirement for the reactions.

Regarding the actual propylene yields, the results in FIGS. 10-14 indicate that selection of the metal dopant is important for optimizing the ODHP behavior, but is of lesser importance compared to the effects on product selectivity. For example, the undoped sample (FIG. 10) displayed the highest $CO_2$ conversion at 600° C., but also generated the lowest propylene yield (i.e., 15%). In contrast, at the same temperature the metal-doped samples all displayed some degree of enhancement in both propane conversion and propylene yield. Specifically, the highest propylene yields were observed in CaO—In@ZSM-5 (FIG. 11), CaO—Mo@ZSM-5 (FIG. 13), and CaO—Cr@ZSM-5 (FIG. 14) which achieved 22%, 20.4%, and 24% yields, respectively. For example, CaO—Mo@ZSM-5 provided a good balance of $CO_2$ conversion and propylene yield for dual-functional $CO_2$ adsorption and ODHP catalysis. As seen in FIGS. 9-14, the additively manufactured structures are viable dual-functional materials (DFMs) and provided reactions, for example, where propylene was generated whilst $CO_2$ was consumed.

In addition, the selectivity for products of the reaction were determined for each structure, as shown in Table 12.

TABLE 12

| Sample | Reaction Temperature (° C.) | $C_3H_6$ Selectivity (%) | $C_2H_4$ Selectivity (%) | $CH_4$ Selectivity (%) | CO Selectivity (%) | $H_2$ Selectivity (%) | $H_2O$ Selectivity (%) |
|---|---|---|---|---|---|---|---|
| CaO—ZSM-5 | 600 | 36.7 | 0.0 | 18.4 | 26.4 | 7.5 | 11.0 |
|  | 650 | 13.2 | 21.6 | 15.6 | 15.8 | 25.1 | 8.7 |
|  | 700 | 6.23 | 26.5 | 21.7 | 20.6 | 21.1 | 4.0 |
| CaO—In@ZSM-5 | 600 | 40.7 | 0.1 | 12.7 | 23.5 | 5.5 | 17.6 |
|  | 650 | 23.7 | 13.3 | 12.0 | 27.1 | 20.8 | 3.2 |
|  | 700 | 14.2 | 28.4 | 26.4 | 8.8 | 17.4 | 4.9 |
| CaO—Ce@ZSM-5 | 600 | 37.2 | 2.2 | 18.4 | 13.9 | 11.4 | 16.8 |
|  | 650 | 31.8 | 1.7 | 21.6 | 19.9 | 8.7 | 16.3 |
|  | 700 | 9.9 | 23.4 | 21.7 | 21.6 | 19.9 | 3.6 |
| CaO—Mo@ZSM-5 | 600 | 28.3 | 0.1 | 17.4 | 22.8 | 3.2 | 28.3 |
|  | 650 | 12.3 | 23.3 | 19.8 | 19.2 | 22.8 | 2.6 |
|  | 700 | 6.3 | 24.0 | 20.0 | 26.2 | 20.3 | 3.2 |
| CaO—Cr@ZSM-5 | 600 | 34.5 | 2.1 | 12.2 | 24.6 | 13.6 | 12.7 |
|  | 650 | 15.6 | 16.9 | 17.6 | 19.7 | 23.2 | 7.0 |
|  | 700 | 10.6 | 25.7 | 20.2 | 17.8 | 21.7 | 4.1 |

TABLE 13

| Sample | $CO_2$ adsorbed (mmol/g) | $CO_2$ Conversion (%) | $C_2H_6$ Conversion (%) | $C_2H_4$ Selectivity (%) | $C_2H_4$ Yield (%) |
|---|---|---|---|---|---|
| CaO—ZSM-5 | 1.3 | 27.1 | 34.3 | 79.8 | 27.4 |
| CaO—Ce/ZSM-5 | 1.3 | 33.7 | 33.2 | 98.5 | 32.7 |
| CaO—Mo/ZSM-5 | 1.7 | 22.6 | 34.9 | 89.4 | 31.2 |
| CaO—Cr/ZSM-5 | 1.0 | 56.0 | 37.1 | 91.2 | 33.8 |
| CaO—In/ZSM-5 | 1.5 | 18.2 | 30.7 | 91.6 | 28.1 |

In addition, the structures were used for a reactionary process including adsorption of $CO_2$ and for oxidative dehydrogenation of ethane (ODHE). For example, the additively manufactured structures were exposed to 40 mL/min of $N_2$ and heated at 10° C./min to 750° C. for 1 hour. Next, the environment of the additively manufactured structures was cooled to 600° C. and 60 mL/min of 10% $CO_2/N_2$ was allowed to flow into the system for 90 minutes to saturate the adsorbent phase. To determine ODHE properties, the additively manufactured structures were exposed to 40 mL/min of Ar and heated at 10° C./min to 750° C. for 1 hour. Next, the environment of the additively manufactured structures was cooled to 600° C. and 25 mL/min of 10% $CO_2$/Ar was allowed to flow into the system for 1 h. Then, the system was heated at 10° C./min to the desired reaction temperature 700° C. while maintaining a flow of $CO_2$/Ar. Upon reaching the desired temperature, the flow of $CO_2$ was terminated and 25 mL/min of 7% $C_2H_6$/Ar was delivered into the reactor. The concentration profiles of the species were collected with an MKS Cirrus II Mass Spectrometer throughout the entirety of the experiment, and the $CO_2$ adsorption capacities of the different samples were assessed with thermogravimetric analysis (TGA) on a Q500 thermogravimetric gas analyzer (TGA).

Figure 15:
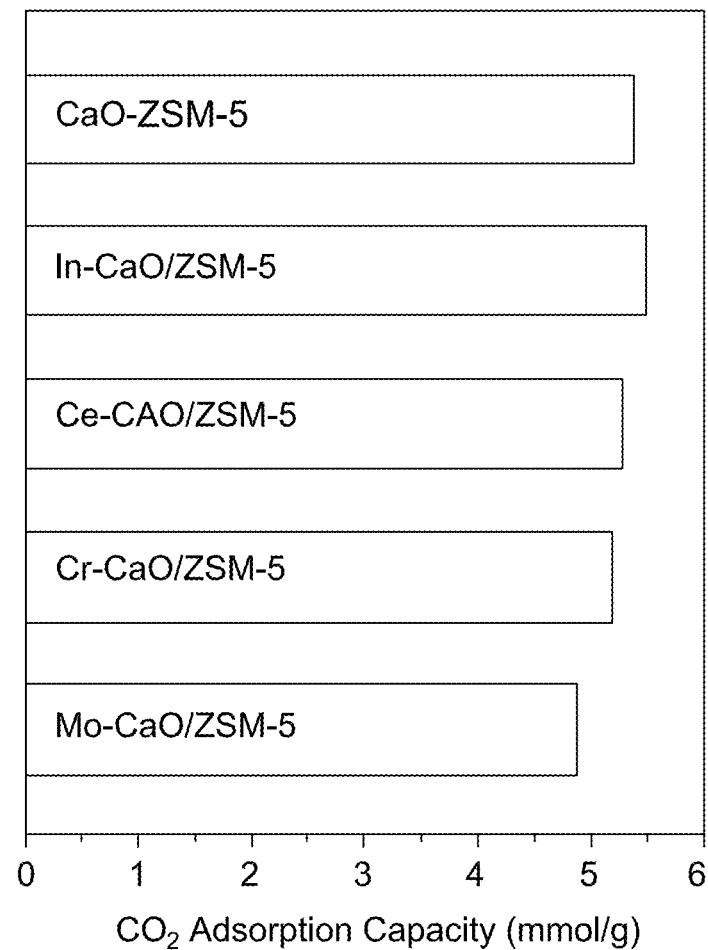
FIG. 15 is a bar graph illustrating $CO_2$ adsorption capacity for additively manufactured structures including composite dual-functional absorbent-catalyst materials.

FIG. 15 and Table 13 show reactive properties of the additively manufactured structures. Specifically, FIG. 15 is a bar graph indicating the $CO_2$ adsorption capacities of the additively manufactured structures. Table 13 includes the $CO_2$ adsorbed, $CO_2$ conversion, $C_2H_6$ conversion, the $C_2H_4$ selectivity, and the $C_2H_4$ yield.

The additively manufactured structures provided high conversion rates and high selectivity for the tested reactionary processes.

Example

In one embodiment, additively manufactured structures were formed using the additive manufacturing system 10 (shown in FIG. 1). A first additively manufactured structure was fabricated using CaO derived from calcined $CaCO_3$ and ZSM-5 as catalysts without an active agent. A second additively manufactured structure was fabricated using CaO derived from calcined $CaCO_3$ and ZSM-5 as catalysts and $V_2O_5$ as an active agent. A third additively manufactured structure was fabricated using CaO derived from calcined $CaCO_3$ and ZSM-5 as catalysts and $Ga_2O_3$ as an active agent. A fourth additively manufactured structure was fabricated using CaO derived from calcined $CaCO_3$ and ZSM-5 as catalysts and $TiO_2$ as an active agent. A fifth additively manufactured structure was fabricated using CaO derived from calcined $CaCO_3$ and ZSM-5 as catalysts and NiO as an active agent. Initially, the ZSM-5 and $CaO_3$ were activated. Binders and solvents were selected for each of the materials. For example, bentonite clay (BC) was used as an inorganic binder and methylcellulose (MC) was used as a plasticizing organic binder. Deionized (DI) water or DI water mixed with methanol (MeOH) was used as a solvent. Table 14 provides the weight and percentages for the binders, active agents, and catalyst for each additively manufactured structure.

TABLE 14

| Sample | ZSM-5 (wt. %) | CaCO3 (wt. %) | Bentonite Clay (wt. %) | Methyl-cellulose (wt. %) | V2O5 (wt. %) | Ga2O3 (wt. %) | TiO2 (wt. %) | NiO (wt. %) |
|---|---|---|---|---|---|---|---|---|
| CaO—ZSM-5 | 29.0 | 59.0 | 10.0 | 2.0 | 0.0 | 0.0 | 0.0 | 0.0 |
| CaO—V/ZSM-5 | 27.4 | 55.5 | 9.1 | 1.9 | 6.1 | 0.0 | 0.0 | 0.0 |
| CaO—GA/ZSM-5 | 27.4 | 55.5 | 9.1 | 1.9 | 0.0 | 6.1 | 0.0 | 0.0 |
| CaO—Ti/ZSM-5 | 27.4 | 55.5 | 9.1 | 1.9 | 0.0 | 0.0 | 6.1 | 0.0 |
| CaO—Ni/ZSM-5 | 27.4 | 55.5 | 9.1 | 1.9 | 0.0 | 0.0 | 0.0 | 6.1 |

The catalyst ($CaCO_3$ and ZSM-5), active agents ($V_2O_5$, $Ga_2O_3$, $TiO_2$, and NiO), and binders (BC and MC) were dispersed into respective solvent mixtures to form a paste. For example, the components were mixed with distilled water inside of a polytetrafluoroethylene (PTFE) bottle until the powders dispersed and formed a paste. The pastes were then rolled at 60 rpm for 48 hours at 25° Celsius (C) to achieve binding. The pastes were heated at 60° C. for 4 hours to extract water and obtain a self-standing rheology. As used herein, self-standing rheology refers to a material which retains layer separation after printing without fluidic spreading.

An additive manufacturing system (e.g., an aluminum prusa I3A pro 3D printer sold by Geetech Electronics Inc.) was used to form the structures. CAD software was used to design the monolith structures and a controller was used to read the generated CAD files and control operation of the printer. The pastes were loaded into syringes for extrusion. For example, about 3 to 10 cubic centimeters (cc) were loaded into each syringe. A piston head was placed into each syringe after the syringe was loaded with the paste. When the printer was ready to deposit each material onto the build platform, a pressurized air flow having a pressure in a range of 0-5 bar (depending on viscosity of the material) was supplied to the syringe to extrude the material through a 0.85 mm nozzle connected to the syringe.

The materials were deposited in a series of layers to form the desired height and shape of each structure. For example, a syringe was connected to the printer and used to deposit each layer of the material.

The structures underwent heat treating to prevent cracking and improve strength. Specifically, the structures were dried at ambient temperature for 12 hours at 25° C. and then heated to 550° C. for 6 hours to calcinate the structure. Once cooled and dried, the composites were removed from the build platform and calcined to form monolithic structures including unreduced metal oxide. Accordingly, the samples provided unitary structures which were configured to provide desired reactions when the structures were exposed to a reactant.

The structures were used for a reactionary process including adsorption of $CO_2$. For example, the additively manufactured structures were exposed to 20 mL/min of $N_2$ and heated at 10° C./min to 750° C. for 1 hour. Next, the environment of the additively manufactured structures was cooled to 600° C. and 60 mL/min of 10% $CO_2/N_2$ was allowed to flow into the system for 1 h to saturate the adsorbent phase. To prepare for the adsorption/catalysis experiments, the additively manufactured structures were exposed to 20 mL/min of Ar and heated at 10° C./min to 700° C. for 1 hour. Next, the environment of the additively manufactured structures was cooled to 600° C. and 20 mL/min of 10% $CO_2$/Ar was allowed to flow into the system for 1 h. Then, the system was heated at 10° C./min to the desired reaction temperature (600, 650 or 700° C.) while maintaining a flow of $CO_2$. Upon reaching the desired temperature, the flow of $CO_2$ was terminated and 20 mL/min of 5% $C_3H_8$/Ar was delivered into the reactor. The concentration profiles of the species were collected with an MKS Cirrus II Mass Spectrometer throughout the entirety of the experiment, and the $CO_2$ adsorption capacities of the different samples were assessed with thermogravimetric analysis (TGA) on a Q500 thermogravimetric gas analyzer (TGA).

Figure 16:
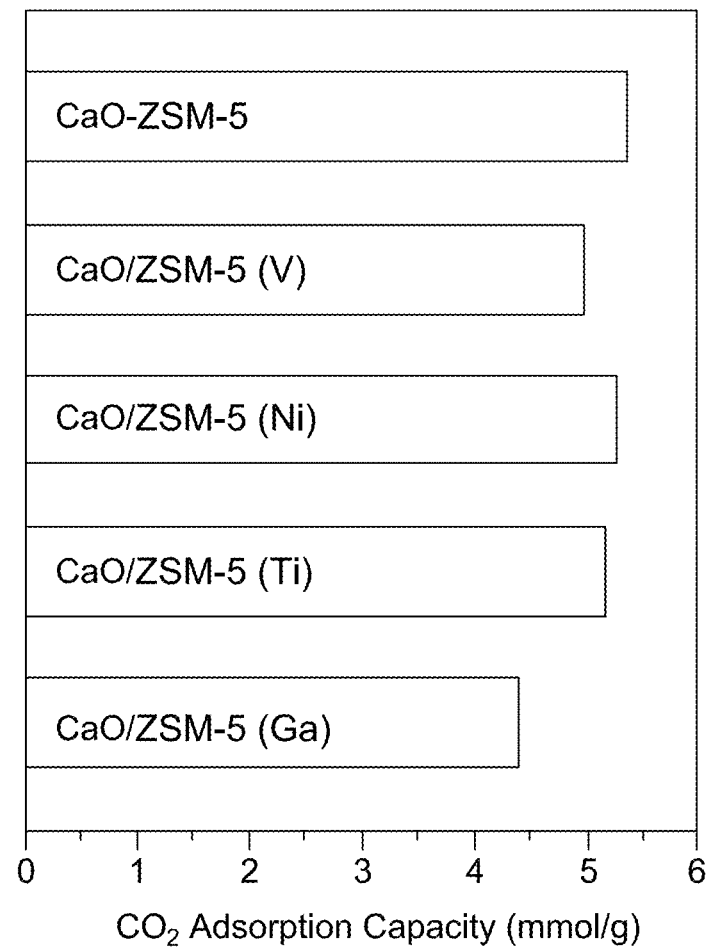
FIG. 16 is a bar graph illustrating $CO_2$ adsorption capacity for additively manufactured structures including composite dual-functional absorbent-catalyst materials.

FIG. 16 and Table 15 show reactive properties of the additively manufactured structures. Specifically, FIG. 15 is a bar graph indicating the $CO_2$ adsorption capacities of the additively manufactured structures. Table 14 includes the $C_3H_8$ conversion, $CO_2$ conversion, $C_3H_6$ yield, and the selectivity for products of the reaction for each of the additively manufactured structures at the tested temperatures.

TABLE 15

| Sample | Reaction Temperature (° C.) | $C_3H_8$ Conversion (%) | $CO_2$ Conversion (%) | $C_3H_6$ Yield (%) | $C_3H_6$ Selectivity (%) | $C_2H_4$ Selectivity (%) | $CH_4$ Selectivity (%) | CO Selectivity (%) | $H_2$ Selectivity (%) | $H_2O$ Selectivity (%) |
|---|---|---|---|---|---|---|---|---|---|---|
| CaO—ZSM-5 | 600 | 19.1 | 78.1 | 16.3 | 36.7 | 0.0 | 18.4 | 26.4 | 7.5 | 11.0 |
|  | 650 | 29.4 | 62.3 | 19.3 | 13.2 | 21.6 | 15.6 | 15.8 | 25.1 | 8.7 |
|  | 700 | 36.0 | 57.5 | 23.2 | 6.23 | 26.5 | 21.7 | 20.6 | 21.1 | 4.0 |
| CaO—V/ZSM-5 | 600 | 25.6 | 65.6 | 22.8 | 25.2 | 0.1 | 12.7 | 23.5 | 5.5 | 17.6 |
|  | 650 | 36.4 | 60.3 | 24 | 16.3 | 13.3 | 12.0 | 27.1 | 20.8 | 3.2 |
|  | 700 | 41.5 | 55.2 | 26 | 8.9 | 28.4 | 26.4 | 8.8 | 17.4 | 4.9 |
| CaO—Ni/ZSM-5 | 600 | 24.2 | 71.2 | 17.8 | 9.7 | 2.2 | 18.4 | 13.9 | 11.4 | 16.8 |
|  | 650 | 28.8 | 60.0 | 20.3 | 5.8 | 1.7 | 21.6 | 19.9 | 8.7 | 16.3 |
|  | 700 | 39.1 | 33.3 | 20.2 | 3.8 | 23.4 | 21.7 | 21.6 | 19.9 | 3.6 |

TABLE 15-continued

| Sample | Reaction Temperature (° C.) | $C_3H_8$ Conversion (%) | $CO_2$ Conversion (%) | $C_3H_6$ Yield (%) | $C_3H_6$ Selectivity (%) | $C_2H_4$ Selectivity (%) | $CH_4$ Selectivity (%) | CO Selectivity (%) | $H_2$ Selectivity (%) | $H_2O$ Selectivity (%) |
|---|---|---|---|---|---|---|---|---|---|---|
| CaO—Ti/ | 600 | 23.1 | 75.7 | 19.0 | 39.0 | 0.1 | 17.4 | 22.8 | 3.2 | 28.3 |
| ZSM-5 | 650 | 32.4 | 67.6 | 21.9 | 19.8 | 23.3 | 19.8 | 19.2 | 22.8 | 2.6 |
|  | 700 | 36.5 | 56.7 | 23.6 | 7.5 | 24.0 | 20.0 | 26.2 | 20.3 | 3.2 |
| CaO—Ga/ | 600 | 25.5 | 70.2 | 23.0 | 42.0 | 2.1 | 12.2 | 24.6 | 13.6 | 12.7 |
| ZSM-5 | 650 | 30.8 | 60.7 | 24.4 | 22.5 | 16.9 | 17.6 | 19.7 | 23.2 | 7.0 |
|  | 700 | 37.2 | 58.6 | 25.3 | 7.0 | 25.7 | 20.2 | 17.8 | 21.7 | 4.1 |

In addition, the structures were used for a reactionary process including adsorption of $CO_2$ and for oxidative dehydrogenation of ethane (ODHE). For example, the additively manufactured structures were exposed to 40 mL/min of $N_2$ and heated at 10° C./min to 750° C. for 1 hour. Next, the environment of the additively manufactured structures was cooled to 600° C. and 60 mL/min of 10% $CO_2/N_2$ was allowed to flow into the system for 90 minutes to saturate the adsorbent phase. To determine ODHE properties, the additively manufactured structures were exposed to 40 mL/min of Ar and heated at 10° C./min to 750° C. for 1 hour. Next, the environment of the additively manufactured structures was cooled to 600° C. and 25 mL/min of 10% $CO_2/Ar$ was allowed to flow into the system for 1 h. Then, the system was heated at 10° C./min to the desired reaction temperature 700° C. while maintaining a flow of $CO_2/Ar$. Upon reaching the desired temperature, the flow of $CO_2$ was terminated and 25 mL/min of 7% $C_2H_6/Ar$ was delivered into the reactor. The concentration profiles of the species were collected with an MKS Cirrus II Mass Spectrometer throughout the entirety of the experiment, and the $CO_2$ adsorption capacities of the different samples were assessed with thermogravimetric analysis (TGA) on a Q500 thermogravimetric gas analyzer (TGA).

Figure 17:
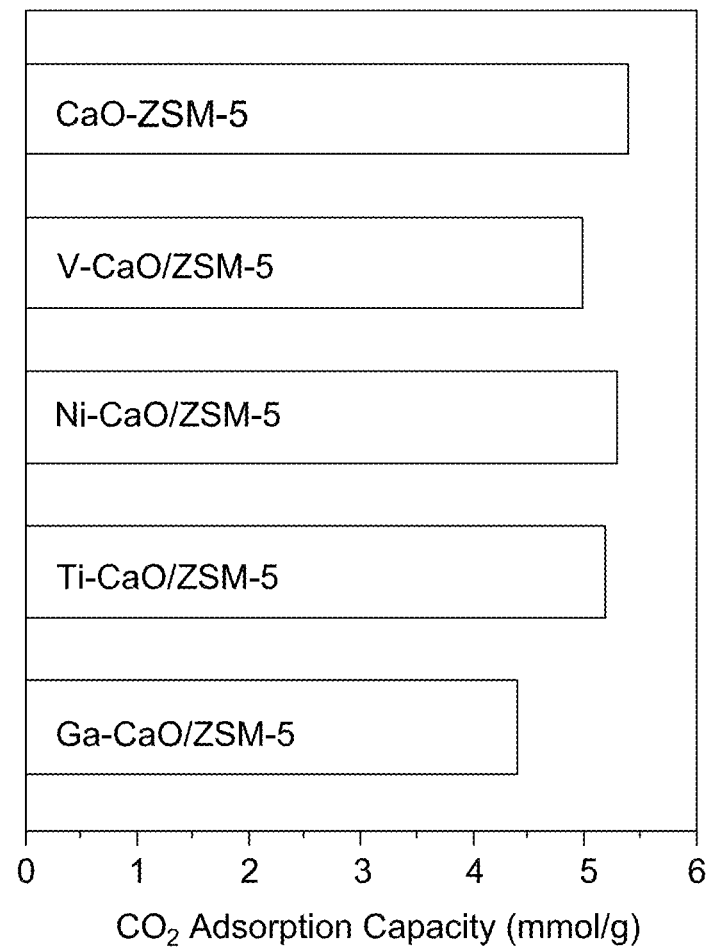
FIG. 17 is a bar graph illustrating $CO_2$ adsorption capacity for additively manufactured structures including composite dual-functional absorbent-catalyst materials.

FIG. 17 and Table 16 show reactive properties of the additively manufactured structures. Specifically, FIG. 16 is a bar graph indicating the $CO_2$ adsorption capacities of the additively manufactured structures. Table 15 includes the $CO_2$ adsorbed, $CO_2$ conversion, $C_2H_6$ conversion, the $C_2H_4$ selectivity, and the $C_2H_4$ yield.

TABLE 16

| Sample | $CO_2$ adsorbed (mmol/g) | $CO_2$ Conversion (%) | $C_2H_6$ Conversion (%) | $C_2H_4$ Selectivity (%) | $C_2H_4$ Yield (%) |
|---|---|---|---|---|---|
| CaO—ZSM-5 | 1.3 | 27.1 | 34.3 | 79.8 | 27.4 |
| CaO—V/ZSM-5 | 1.3 | 65.2 | 36.5 | 98.0 | 35.8 |
| CaO—Ni/ZSM-5 | 1.0 | 66.0 | 28.9 | 96.8 | 28.0 |
| CaO—Ti/ZSM-5 | 1.1 | 29.7 | 33.9 | 97.5 | 33.1 |
| CaO—Ga/ZSM-5 | 3.3 | 11.2 | 33.7 | 91.3 | 30.7 |

The additively manufactured structures provided high conversion rates and high selectivity for the tested reactionary processes.

The systems and methods described herein may be used to form structures for any reactionary processes and not just those described herein. For example, the additively-manufactured structures may be used for photocatalytic absorbents in borosilicate glass and metal organic frameworks (MOF) composites, photocatalytic absorbents in borosilicate and zeolite composite systems, simultaneous adsorption and catalytic conversion of carbon dioxide on zeolite structures, for Zeolite/metal oxide systems, and for enhanced methane storage capacity for copper MOF and graphene oxide composites.

When introducing elements of the present disclosure or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the disclosure, it is intended that all matter contained in the above description or shown in the accompanying drawings shall be interpreted as illustrative and not in a limiting sense.

What is claimed is:

1. A method of additively manufacturing a structure for use in a catalytic process, the method comprising:
    forming a first ink and a second ink,
        wherein the first ink includes a first material including a first binder and a first active agent, and
        wherein the second ink includes a second material including a second binder and a second active agent,
            wherein each of the first active agent and the second active agent include metal nanoparticles;
    depositing the first ink and the second ink onto a build platform; and
    curing the ink to form a structure for use in the catalytic process, wherein the structure is a lattice structure comprising a plurality of layers,
    wherein the plurality of layers alternate between the first material formed by the first ink and the second material formed by the second ink between each of the plurality of layers,
    wherein each of the plurality of layers comprise a plurality of ribs arranged in a grid pattern to form a plurality of channels extending through the layer,
    wherein the grid pattern of each of the plurality of layers is offset by 90° from the grid pattern of the adjacent layer of the plurality of layers such that the plurality of ribs of each of the plurality of layers are perpendicular to the plurality of ribs of the adjacent layer,
    wherein the plurality of ribs partially occlude the channels from the adjacent layer of the plurality of layers to form a tortuous flow path,
    wherein the structure includes the first material and the second material including the metal nanoparticles, wherein the metal nanoparticles are insoluble and are suspended within the structure, wherein the metal nanoparticles are configured to provide a reaction when exposed to a reactant in the catalytic process.

2. The method of claim 1, wherein the metal nanoparticles are configured to provide a catalytic conversion of at least one reactant during a reactionary process.

3. The method of claim 1, the method further comprising:
adhering the second ink to the first ink to form an additively manufactured structure for use in a reactionary process, wherein the first ink provides a first reaction during the reactionary process and the second ink provides a second reaction during the reactionary process.

4. The method of claim 1, wherein the metal nanoparticles comprise at least one of copper nanoparticles, palladium nanoparticles, gold nanoparticles, silver nanoparticles, and/or platinum nanoparticles.

5. An additively manufactured structure for use in a catalytic process, the structure comprising:
a first material including a first binder and a first active agent; and
a second material including a second binder and a second active agent,
wherein at least one of the first active agent and the second active agent include metal nanoparticles,
wherein the structure is a lattice structure comprising a plurality of layers,
wherein the plurality of layers alternate between the first material and the second material,
wherein each of the plurality of layers comprise a plurality of ribs arranged in a grid pattern to form a plurality of channels extending through the layer,
wherein the grid pattern of each of the plurality of layers is offset by 90° from the grid pattern of the adjacent layer of the plurality of layers such that the plurality of ribs of each of the plurality of layers are perpendicular to the plurality of ribs of the adjacent layer,
wherein the plurality of ribs partially occlude the channels from the adjacent layer of the plurality of layers to form a tortuous flow path,
wherein the metal nanoparticles are insoluble and are suspended within the structure, and
wherein the metal nanoparticles are configured to provide a reaction when exposed to a reactant in the catalytic process.

6. The additively manufactured structure of claim 5, wherein the metal nanoparticles comprise at least one of copper nanoparticles, palladium nanoparticles, gold nanoparticles, silver nanoparticles, and/or platinum nanoparticles.

7. The additively manufactured structure of claim 5, wherein the first material provides a first reaction during the catalytic process and the second material provides a second reaction during a reactionary process.

8. A method of forming of manufacturing a structure for use in a catalytic process, the method comprising:
forming a first ink and a second ink, wherein forming the first ink and the second ink comprise:
combining a first binder and a first active agent for the first ink, and
combining a second binder and a second active agent for the second ink;
wherein at least one of the first active agent and the second active agent include metal nanoparticles, wherein the metal nanoparticles are insoluble and are suspended within the structure,
wherein the structure is a lattice structure comprising a plurality of layers,
wherein the plurality of layers alternate between a first material formed by the first ink and a second material formed by the second ink between each of the plurality of layers,
wherein each of the plurality of layers comprise a plurality of ribs arranged in a grid pattern to form a plurality of channels extending through the layer,
wherein the grid pattern of each of the plurality of layers is offset by 90° from the grid pattern of the adjacent layer of the plurality of layers such that the plurality of ribs of each of the plurality of layers are perpendicular to the plurality of ribs of the adjacent layer,
wherein the plurality of ribs partially occlude the channels from the adjacent layer of the plurality of layers to form a tortuous flow path, and
wherein the metal nanoparticles are configured to provide a reaction when exposed to a reactant in the catalytic process.

9. The method of claim 8, wherein the metal nanoparticles are configured to provide a catalytic conversion of at least one reactant during a reactionary process.

10. The method of claim 8, wherein the metal nanoparticles comprise at least one of copper nanoparticles, palladium nanoparticles, gold nanoparticles, silver nanoparticles, and/or platinum nanoparticles.

11. The method of claim 8, wherein the binder comprises at least one of bentonite or kaolinite clay.

12. The method of claim 8, wherein each of the first ink and the second ink further include a dispersion solvent, wherein the dispersion solvent comprises at least one of distilled water and alcohol.

13. The additively manufactured structure of claim 5, wherein the metal nanoparticles are in the range of 10% to 85% by weight of the structure.

14. The additively manufactured structure of claim 5, wherein each of the first material and the second material includes a dispersion solvent comprising at least one of distilled water and alcohol.

* * * * *